United States Patent
Dabell

(10) Patent No.: US 11,781,883 B1
(45) Date of Patent: Oct. 10, 2023

(54) METHOD AND APPARATUS FOR UTILIZING ESTIMATED PATROL PROPERTIES AND HISTORIC PATROL RECORDS

(71) Applicant: Steve Dabell, Spokane, WA (US)

(72) Inventor: Steve Dabell, Spokane, WA (US)

( * ) Notice: Subject to any disclaimer, the term of this patent is extended or adjusted under 35 U.S.C. 154(b) by 258 days.

(21) Appl. No.: 17/380,533

(22) Filed: Jul. 20, 2021

Related U.S. Application Data

(63) Continuation-in-part of application No. 16/895,000, filed on Jun. 8, 2020, now Pat. No. 11,508,022.

(51) Int. Cl.
*G01C 21/00* (2006.01)
*G06Q 50/26* (2012.01)

(52) U.S. Cl.
CPC ..... *G01C 21/3874* (2020.08); *G01C 21/3815* (2020.08); *G01C 21/3889* (2020.08); *G01C 21/3896* (2020.08); *G06Q 50/26* (2013.01)

(58) Field of Classification Search
None
See application file for complete search history.

(56) References Cited

U.S. PATENT DOCUMENTS

| | | | | |
|---|---|---|---|---|
| 6,546,119 B2 * | 4/2003 | Ciolli | ................... | G08G 1/0175 382/104 |
| 7,912,628 B2 * | 3/2011 | Chapman | ............. | G08G 1/0141 701/117 |
| 8,031,062 B2 * | 10/2011 | Smith | ................... | G08G 1/0962 340/936 |
| 8,229,658 B1 * | 7/2012 | Dabell | ................. | G08G 1/0129 701/117 |
| 8,751,133 B2 * | 6/2014 | Poulin | ................. | B60W 30/146 700/304 |
| 8,842,004 B2 * | 9/2014 | Kabler | .................... | G01S 7/022 340/539.11 |
| 8,970,422 B2 * | 3/2015 | Washlow | ............... | H04K 3/822 342/13 |
| 9,110,543 B1 * | 8/2015 | Dabell | ................ | G06F 3/03545 |
| 9,171,461 B1 * | 10/2015 | Dabell | ............. | G08G 1/096775 |
| 9,779,357 B1 * | 10/2017 | Dabell | ................. | G08G 1/0137 |
| 10,088,940 B1 * | 10/2018 | Dabell | ................. | G06F 3/0488 |
| 10,719,899 B1 * | 7/2020 | Dabell | ................. | G06Q 50/26 |
| 10,748,076 B1 * | 8/2020 | Dabell | ............. | G08G 1/096716 |
| 10,895,928 B1 * | 1/2021 | Dabell | ................ | G06F 3/04166 |
| 11,507,870 B1 * | 11/2022 | Dabell | ............. | G08G 1/096716 |
| 11,508,022 B1 * | 11/2022 | Dabell | ............. | G06F 16/90335 |
| 2007/0208498 A1 * | 9/2007 | Barker | ................ | G08G 1/0969 701/117 |
| 2007/0208501 A1 * | 9/2007 | Downs | ..................... | B60T 7/18 701/79 |
| 2007/0216521 A1 * | 9/2007 | Guensler | .......... | G08G 1/096775 340/936 |

(Continued)

*Primary Examiner* — Thomas E Worden

(57) ABSTRACT

It is an object of the present invention to provide a predictive traffic law enforcement profiler apparatus and method which incorporates a means to determine current location, time, velocity and also incorporates a means to utilize a database derived from historic traffic law enforcement records, crowd sourced records and historical traffic data and also incorporates a predictive processing means to provide historic traffic law enforcement records and estimates of enforced speed limits and enforcement profiles, patrol locations and schedules of traffic law enforcement to a driver.

22 Claims, 7 Drawing Sheets

(56) References Cited

U.S. PATENT DOCUMENTS

| | | | |
|---|---|---|---|
| 2009/0140887 A1* | 6/2009 | Breed | G01C 21/1656 |
| | | | 701/116 |
| 2011/0029224 A1* | 2/2011 | Chapman | G08G 1/0104 |
| | | | 701/117 |
| 2011/0112747 A1* | 5/2011 | Downs | G08G 1/0104 |
| | | | 701/119 |
| 2011/0137545 A1* | 6/2011 | Downs | G08G 1/0133 |
| | | | 701/119 |
| 2012/0035839 A1* | 2/2012 | Stehle | G06Q 30/0207 |
| | | | 701/117 |
| 2012/0072096 A1* | 3/2012 | Chapman | G08G 1/0133 |
| | | | 701/117 |
| 2013/0214939 A1* | 8/2013 | Washlow | G01S 7/022 |
| | | | 340/901 |
| 2016/0321563 A1* | 11/2016 | Sinha | G06N 3/008 |
| 2017/0294053 A1* | 10/2017 | Kao | G06K 19/06037 |
| 2018/0182179 A1* | 6/2018 | Teh | G06Q 50/265 |

\* cited by examiner

METHOD AND APPARATUS FOR UTILIZING ESTIMATED PATROL PROPERTIES AND HISTORIC PATROL RECORDS

CROSS REFERENCE OF RELATED APPLICATIONS

This patent is related to Pending U.S. patent application Ser. No. 16/895,000 with filing date Jun. 8, 2020 by the same inventor.

BACKGROUND OF THE INVENTION

The present invention relates to electronic devices used to provide information to drivers, driver assist controllers, automated and autonomous vehicle controllers and more particularly relates to a method and apparatus for utilizing historical data to predict traffic law enforcement patrol patterns, locations, schedules, speed traps, and enforcement profile.

It is well known that road condition information is very important to drivers to improve efficiency and safety of travel. In particular it is beneficial to maximize the amount of relevant road information that is available to drivers and present it in an optimally beneficial way. Heretofore, the most common road condition information has been real time and available from radar detectors for locating immediate traffic law enforcement patrol locations, radar detectors equipped with GPS for detecting locations of red light cameras, fixed speed traps and from the Department of Transportation through GPS based vehicle navigation systems for providing real time road condition data.

However, these techniques primarily provide only real time road condition information and do not provide historic and probabilistic or statistical data. More specifically, data available from traditional radar detectors only provides the driver with immediate law enforcement locations with very little warning. Additionally, current generation radar detectors and smart cell phones equipped with GPS for detecting red light cameras or fixed speed traps only provide fixed location of traffic law enforcement. Additionally, onboard vehicle navigation systems provide only near real time road accident, hazard and condition information. Additionally, exclusive crowd sourced databases of traffic law enforcement encounters are limited and compromised by accuracy of reports. Heretofore, none of the existing driver information apparatus provide the driver with historical statistical and probabilistic data and none predict likely locations of traffic law enforcement or patrol locations, patrol schedules, enforcement profiles, or enforced speed limit. Additionally, heretofore, no existing driver assisted, automated or autonomous vehicles incorporate a means to identify and report traffic law enforcement encounters as contributors to crowd sourced databases without human driver intervention. Furthermore, no existing driver assisted, automated or autonomous vehicle controllers provide a means to utilize real time, historical statistical or probabilistic traffic law enforcement patrol locations, patrol schedules, enforcement profiles, or enforced speed limit estimates to control movement.

It is an object of the present invention to provide historic traffic law enforcement patrol information. An additional object of the present invention is to utilize historic traffic law enforcement information to statistically predict the locations, schedules, and enforcement profile where drivers are likely to encounter traffic law enforcement patrols, speed traps, fixed and mobile speed cameras, red light cameras and provide the enforced speed limit.

It is an additional object of the present invention to utilize historic traffic law enforcement patrol citation records to statistically predict the probabilistic locations of traffic law enforcement patrols, enforcement profiles, speed traps and fixed and mobile speed cameras and red light cameras.

An additional object of the present invention is to provide historic and probabilistic traffic law enforcement patrol information, derived from historical traffic law enforcement data, and statistically predict the locations where it is more likely to encounter traffic law enforcement and speed traps and provide maximum safe speeds to avoid citation An additional object of the present invention is to incorporate driver assisted, automated and autonomous vehicle sourced traffic law enforcement encounter information, and road condition information with crowd sourced databases.

An additional object of the present invention is to provide real time, historic and probabilistic traffic law enforcement patrol information, and road condition information to driver assisted, automated or autonomous vehicle controllers to control movement.

An additional object of the present invention is to utilize real time crowd sourced traffic law enforcement encounter information to provide real time locations of traffic law enforcement to drivers, driver assisted vehicle controllers, and automated or autonomous vehicles controllers.

SUMMARY OF THE INVENTION

It is a general object of the present invention to provide a method for supplying statistical and historical traffic related data to drivers. It is a more specific object of the present invention to provide a predictive traffic law enforcement profiler apparatus which incorporates a means to determine current location, date/time, velocity and also incorporates a means to access a database derived from historical traffic law enforcement records, historical crowd sourced traffic law enforcement encounter records, and historical traffic data and also incorporates a predictive processing means to statistically predict likely patrol locations, schedules, enforcement profiles of traffic law enforcement, enforcement austerity, the enforced speed limit and combinations thereof, and a means to provide this information to drivers, and to driver assisted, automated or autonomous vehicle controllers to control vehicle movement.

It is a more specific object of the present invention to provide a predictive traffic law enforcement profiler apparatus which incorporates a means to determine current location, date/time, velocity and also incorporates a means to access a database derived from historical traffic law enforcement records, historical crowd sourced traffic law enforcement encounter records, and historical traffic data of predicted traffic law enforcement patrol schedules, locations, enforcement profiles, enforcement austerity and enforced speed limit and combinations thereof, and provide this information to drivers.

It is yet another object of the present invention to provide an apparatus and method which provides any combinations of predicted traffic law enforcement patrol locations, schedules, enforcement profiles, enforced speed limits, and the locations of fixed and mobile speed cameras, speed traps, and red light cameras.

It is yet another object of the present invention to provide an apparatus and method which provides historic traffic law enforcement patrol information and a means for filtering and presenting historic traffic law enforcement data.

It is yet another object of the present invention to provide a method for determining likely patrol locations, schedules, enforcement profiles, enforcement austerity, enforced speed limit, locations of speed traps, speed cameras, red light cameras, and combinations thereof, of traffic law enforcement and providing this information to consumers.

It is yet another object of the present invention to incorporate driver assisted, automated and autonomous vehicle sourced traffic law enforcement encounter information with crowd sourced databases of traffic law enforcement encounter records.

It is yet another object of the present invention is to provide real time, historic and probabilistic traffic law enforcement patrol information to driver assisted, automated or autonomous vehicle controllers to control movement.

It is yet another object of the present invention is to utilize real time crowd sourced traffic law enforcement encounter information to provide real time locations of traffic law enforcement to drivers, driver assisted vehicle controllers, and automated or autonomous vehicles controllers.

It is yet another object of the present invention to utilize real time historic and probabilistic traffic law enforcement patrol information, road condition information, traffic flow information to perform navigation and route planning.

The present invention provides an innovational design which incorporates state of the art data processing predictive technology to provide precise action, increased accuracy, lower cost, and added functionality over known existing products.

In a preferred embodiment, the predictive traffic law enforcement profiler apparatus includes a location determining means, a velocity determining means, direction determining means, current time and date determining means, a database means, user control means, a predictive processor means, an indicator means, a computer interface means, a vehicle controller means, a vehicle sensor input means, a telemetry means, and a network interface communication means. Said user control means may be a local control means or a remote control means through said said network interface communication means to configure, control and monitor operation of said apparatus. Said database means may contain any combinations of real time and historic records of traffic law enforcement encounters and records of estimated properties of traffic law enforcement. Said user control means may communicate road hazards, road conditions preferably including weather and ice conditions, and said real time records of traffic law enforcement encounters to said database. Said predictive processing means accesses said database means to provide estimated traffic law enforcement profiles and may perform any algorithmic functions including any combinations of statistical analysis, inferential statistics, data analytics and artificial intelligence on said real time and historic records of traffic law enforcement encounters to predict said properties of traffic law enforcement. Said vehicle sensor means may provide an ability to sense the environment of said vehicle which could include the ability to identify traffic law enforcement, road hazards, road conditions preferably including ice and precipitation and weather. An output from said vehicle sensor means could also be provided to said database or said network interface means. Said vehicle controller means provides ability for said predictive processing means to control vehicle speed and preferably vehicle direction and route. Said telemetry means provides an ability to forward an output from any of said vehicle sensor means, said velocity determining means, said location determining means, said direction determining means to said said database or said network interface means. Said indicator means provides an ability for said predictive processing means to provide said properties of traffic law enforcement preferably using both visual, audible, and electronic signal annunciators. Said predictive traffic law enforcement profiler apparatus further may be partitioned into one or more client means and one or more server means wherein said client means may communicate with said server means through said network interface communication means. Wherein said client means preferably comprises said location determining means, said velocity determining means, said direction determining means, said current time and date determining means, said user input means, said indicator means, said vehicle controller means, and said vehicle sensor input means. Wherein said server means preferably comprises said a database means and said predictive processor means.

In another preferred embodiment, the predictive traffic law enforcement profiler apparatus includes a database means, a predictive processor means, and an indicator means. The database means includes a means for providing the locations where traffic law enforcement has historically issued citations and the information associated with said citations which preferably includes combinations of type of violation, direction of travel, speed of vehicle if cited for speeding, location time and date and may also include reason for stop and type of vehicle. Said predictive processing means cross correlates records in the database to statistically predict the locations and schedules at which it is more probable to encounter traffic law enforcement, and enforcement profile further including enforcement austerity, speed traps, speed cameras, red light cameras and also estimates the enforced speed limit and combinations thereof, of traffic law enforcement. Said indicator means which preferably includes visual and or audible annunciators presents combinations of predicted locations, schedules and enforcement profile further including enforcement austerity, speed traps, speed cameras, red light cameras and also estimated enforced speed limit at said locations, of traffic law enforcement.

In another preferred embodiment, the predictive traffic law enforcement profiler apparatus includes a means to provide estimates of patrol schedules, locations and enforcement profile and combinations thereof, of traffic law enforcement at a singular or plurality of locations comprising: a database means, access means and an indicator means. Said database means provides records, derived from issued citations of traffic law enforcement and crowd sourced encounters with traffic law enforcement and combinations thereof, of patrol schedules, patrol locations, and estimated enforcement profile including any combinations of: enforced speed limits, speed traps, speed cameras, red light cameras and enforcement austerity of traffic law enforcement. Said access means to retrieve combinations of said patrol schedules, patrol locations, and enforcement profile including any combinations of: enforced speed limits, speed traps, speed cameras, red light cameras and enforcement austerity of traffic law enforcement. Said indicator means to present combinations of said patrol schedules, patrol locations, and estimated enforcement profile including any combinations of: enforced speed limits, speed traps, speed cameras, red light cameras of traffic law enforcement.

In another preferred embodiment, the predictive traffic law enforcement apparatus for providing estimates of the enforced speed limit, patrol schedules and enforcement profiles of traffic law enforcement and combinations thereof at a singular or plurality of first locations comprising: a database means, location and velocity determining means, time determining means, record access means and indicator means. Said database means for providing records of estimated traffic law enforcement patrol schedules, enforced speed limits and enforcement profiles derived from a combination of issued citations and crowd sourced encounters of traffic law enforcement at a second plurality of locations. Said location and velocity determining means for determining the location and current velocity of said apparatus. Said record access means to retrieve combinations of said estimated traffic law enforcement patrol schedules, enforced speed limits and enforcement profiles at said first locations from said database means. Said indicator means to present combinations of said estimated patrol schedules, enforced speed limits, and enforcement profiles of traffic law enforcement at said first locations. Said indicator means to notify when said apparatus location is within or approaching locations of said estimated patrol schedules, enforcement profiles and combinations thereof; and a second indicator means to notify when said apparatus velocity exceeds said estimated enforced speed limit at said location of said apparatus.

In another preferred embodiment, the predictive traffic law enforcement profiler apparatus includes a location determining means, current time and date determining means, a database means, user input means, a predictive processor means and an indicator means. Said location determining means includes a means to determine the latitude and longitude location and current velocity. Said time of day determining means includes a means to determine the current date and time. Said database means includes a means for providing the locations where traffic law enforcement has historically issued citations and the information associated with said citations which preferably includes combinations of type of violation, direction of travel, violation speed if cited for speeding, location time and date and may also include reason for stop and type of vehicle. Said predictive processing means correlates current location, velocity, time of day, and user criteria with entries in the database to statistically predict the locations where it is more likely to encounter traffic law enforcement, red light cameras, speed cameras and speed traps and provide maximum safe speeds to avoid citation and provide said information via the indicator means which preferably includes both visual and audible annunciators.

In yet another preferred embodiment, the predictive traffic law enforcement profiler apparatus includes a client means and a server means. Said client means includes a location determining means, a time of day determining means, an indicator means and a means to communicate with one or more said server means. Said server means preferably includes a database means, a predictive processor means and a means to communicate with one or more clients. Said server database means includes a means for providing the locations where traffic law enforcement has historically issued citations and the information associated with said citations which preferably includes combinations of type of violation, direction of travel, speed of vehicle if cited for speeding, location time and date and may also include reason for stop and type of vehicle. Said client location determining means includes a means to determine the latitude and longitude location and current velocity. Said client time of day determining means includes a means to determine the current date and time. Said client communication means provides a means to communicate the client location, client time of day, and client velocity to said server means. Said server predictive processor means correlates said client location, said client velocity, said client time of day, and user client criteria with records in said server database means to statistically predict the locations where it is more likely for said client to encounter any combinations of traffic law enforcement, speed traps, red light cameras, speed cameras and provide maximum safe client speeds to avoid citation derived from said server database of historical issued citations and provide said predicted locations, speed traps, speed cameras and maximum client speeds to avoid citation through said server communication means to said client. Said client indicator means preferably includes combinations of visual and audible annunciators to present any combinations of said server predicted locations of traffic law enforcement, speed traps, red light cameras, speed cameras and maximum client speeds to avoid citation.

In yet another preferred embodiment the predictive traffic law enforcement profiler apparatus includes a means to provide estimates of traffic law enforcement austerity comprising: a location determining means, database means, database access means, and an indicator means. Wherein said database means comprising estimates of enforcement austerity derived from historic records of issued citation warnings, historic records of traffic flow rates and volumes, records of issued citations of traffic law enforcement, and crowd sourced traffic law enforcement encounters and combinations thereof. Said access means to retrieve a combination of said estimated enforcement austerity and an indicator means to present enforcement austerity at said location.

In yet another preferred embodiment, a method is for providing estimates of the enforced speed limit, patrol schedules, enforcement profile, and combinations thereof, of traffic law enforcement at a singular or plurality of locations comprising the steps of: Retrieving a historical record derived from issued traffic law enforcement citations at said location. Correlating citation time, location, violation velocity and combinations thereof to determine enforced speed limit, patrol schedules, and enforcement profile of traffic law enforcement at said locations; presenting said estimated enforced speed limit, estimated patrol schedules, enforcement profiles, and combinations thereof, at said locations.

In yet another preferred embodiment, the predictive law enforcement traffic profiler driver information apparatus also includes a means for monitoring current weather conditions and a database means. The database means includes a means for storing the coordinate locations where accidents have occurred and the recorded details associated with said accidents which preferably includes cause of accident, time of said accident, and weather conditions at time of said accident. In this preferred embodiment, the said predictive processing means correlates current location and current weather conditions with said database to determine relevant locations of probable road hazards via the indicator means which preferably includes both visual and audible annunciators.

Further objects and advantages of the present invention will become apparent to those skilled in the art from a consideration of the following detailed description of the preferred embodiment and drawings.

DETAILED DESCRIPTION

Figure 1:
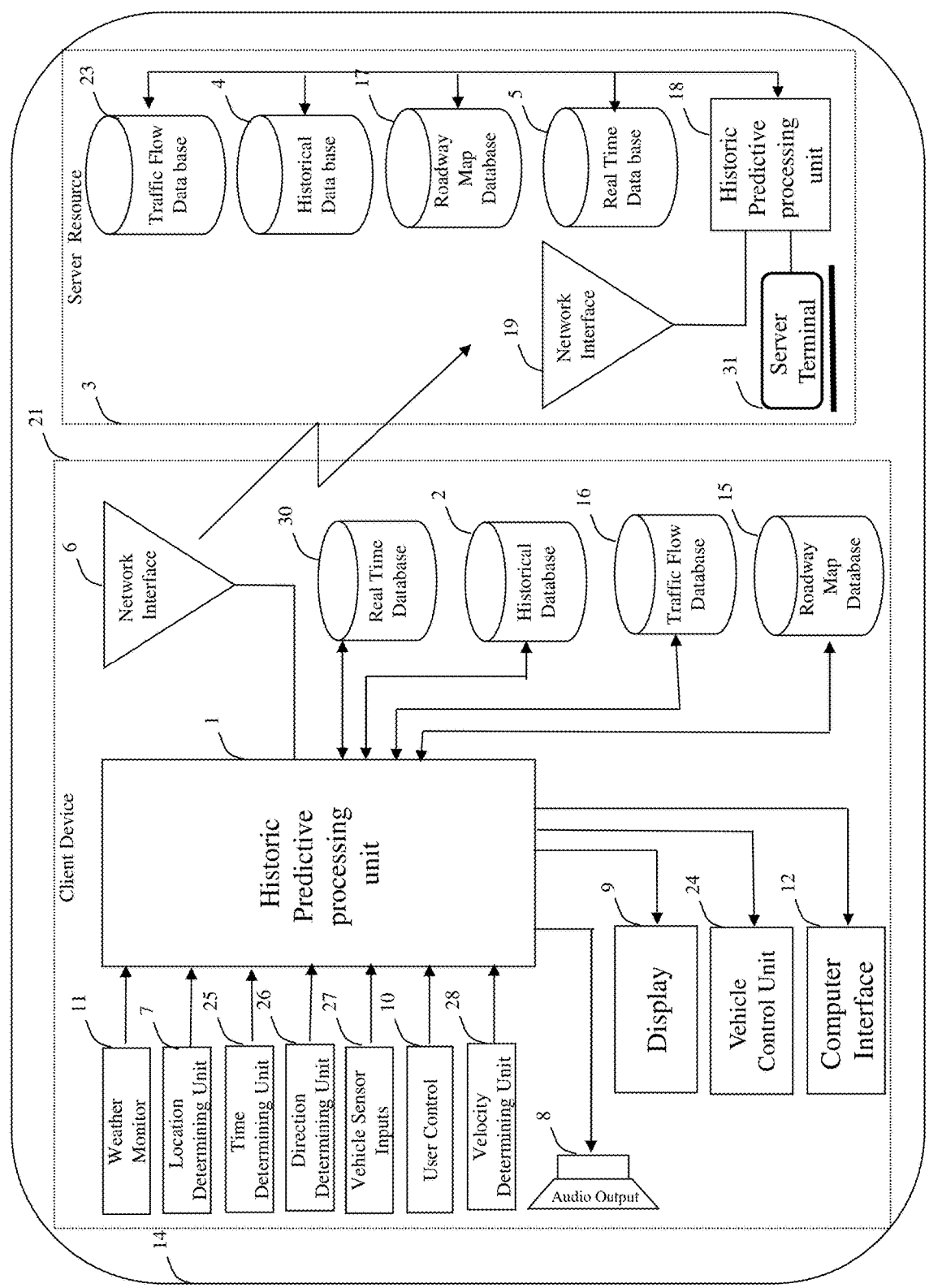
FIG. 1 Block diagram of historic and predictive traffic law enforcement profiler apparatus FIG. 2 A preferred method for profiling traffic law enforcement and providing historic traffic enforcement records FIG. 3 A preferred method of predicting patrol schedules at a location FIG. 4 A preferred presentation of speed limit law enforcement profile FIG. 5 A preferred presentation of historic traffic law enforcement data and estimated enforcement profiles, patrol locations, and patrol schedules of traffic law enforcement.

It is well known that traffic law enforcement agencies have patrol patterns, enforcement profiles and schedules that vary by location, time of day, month and year, weather conditions and traffic flow rates. Generally, traffic law enforcement typically allow some flexibility in enforcing regulations; examples of which could include allowing motorists to exceed the posted speed limit by some margin before issuing a citation or allowing motorists extra time on expired vehicle registrations. The local traffic law enforcement customs may vary by location and time. For instance, in some areas the posted speed limit may be enforced strictly, while in other areas traffic law enforcement may allow much higher speed limits over the posted speed limits prior to issuing a speeding citation. Additionally, it is not uncommon for traffic speed limits to be enforced more rigorously at night than during the day or during certain holidays there may be increased traffic law enforcement patrols and the enforcement profile may be more strict and more focused in certain regions. Additionally, the use of fixed and mobile automated traffic law enforcement systems are commonly used to enforce traffic laws, examples of which include Red Light cameras which photograph and issue citations to operators or registered owners of vehicles passing through an intersection with a red light and Speed Camera systems which photograph and issue a speeding citation to operators or registered owners of vehicles exceeding the speed limit at a location. Automated traffic law enforcement systems are typically at fixed locations, or change locations periodically and also frequently exhibit predetermined enforcement profiles, which could include the enforced speed limit.

In the present invention, the terms estimated patrol schedule, patrol locations and enforcement profiles are defined in Table 1 to characterize the enforcement patterns of traffic law enforcement and utilized in subsequent descriptions of the present invention.

TABLE 1

Traffic Law Enforcement Properties and Patterns which includes combinations of: Estimated and Predicted Patrol Schedules, Patrol Locations, and Enforcement Profiles.

| Traffic Law Enforcement Property | Description |
|---|---|
| Location | The location for which these enforcement properties pertain. |
| Patrol Schedule | The times at which traffic law enforcement is predicted to be present at the Location and also predicts the times with which traffic law enforcement is predicted to not be present at a given location and the confidence of the prediction. |
| Location Patrol Intensity | The predicted intensity with which traffic law enforcement patrols the Location and may be as a function of time and the confidence of the prediction. Locations with higher Patrol Location Intensity may be considered Patrol Locations. |
| Patrol Locations | The locations at which traffic law enforcement is predicted to patrol and also predicts the locations which traffic law enforcement is predicted to not patrol and may be as a function of time and the confidence of the prediction. A Patrol Location may have higher Location Patrol Intensity. |
| Enforcement Profile | The estimated and predicted characteristics which describe traffic law enforcement at the Location which may include any combinations of:<br>a) Enforced speed limit at location and time<br>b) Speed trap enforced location<br>c) Speed camera enforced location<br>d) Red light camera enforced location<br>e) Aircraft speed limit enforced location<br>f) Histogram of enforced traffic laws<br>g) Histogram of citation speeds<br>h) Location citation density<br>i) Enforcement Profile of Traffic Laws<br>j) Probability of traffic citation at location and time<br>k) Probability of encountering traffic law enforcement at location and time<br>l) Enforcement Austerity - traffic law enforcement inflexibility and Austereness<br>  a. Enforcement Leniency Profile -probability of receiving a citation verses a warning as a function of violation type<br>  b. Speed Limit Enforcement Austerity Relative to Average Traffic Flow Velocity - estimated enforced speed limit relative to the traffic velocity<br>  c. Speed Limit Enforcement Austerity Relative to Average Traffic Flow Volume - estimated enforced speed limit relative to the traffic volume<br>  d. Location Enforcement Austerity Relative to Average Traffic Flow Volume - estimated amount a location is patrolled relative to traffic volume |

State and city law enforcement agencies maintain databases of traffic violations that were issued. Examples of traffic violations may include but are not limited to speeding citations, expired vehicle registration, and other moving and non-moving traffic violations. Each citation record typically includes information relevant to the violation. In the case of speeding citations, typically the time, date, location, direction and speed of the vehicle are recorded. In the case of expired registrations, typically the time, date, location, and duration of expiration are recorded. In the present invention, the term "citation record" or "citation" refers to the collection of data captured with an issued citation. Additionally, it is also possible to maintain databases of crowd or user sourced data which could include information provided by individuals that experienced an encounter with traffic law enforcement. Such encounters could include traffic stops by traffic law enforcement and the reason for stop could be provided, location, time, date, and preferably the speed at which the driver was travelling could be provided to the database. Additionally, an encounter could also be a vehicle passing a traffic law enforcement vehicle in which case the location, time, date, direction and preferably speed at which the user was travelling could be contained in the database. In the present invention, the term "encounter record" or "encounter" refers to the collection of data captured with a crowd sourced encounter event with traffic law enforcement.

In the present invention the term "driver" refers to a controller of a vehicle which includes human or machine controllers or any combination thereof. Machine controllers provide a level of automation of a vehicle system and include sensors to sample the environment which could include sensing and identifying the location of traffic law enforcement vehicles, other vehicle locations, directions and speeds in the vicinity of the vehicle, traffic signs such as posted speed limit signs, stop signs, caution signs, school zones, construction zones, road surface conditions, and weather conditions, processors to evaluate environmental information and human driver preferences to produce control decisions, and actuators to effect vehicle movement. Examples of machine controllers may include cruise controllers which control the speed of a vehicle, adaptive cruise controllers which control the speed of a vehicle but may vary the speed based on environmental conditions such as posted speed limit signs, school zones, constructions zones or caution signs, lane assist controllers which assist a human driver with directional control to travel in lanes which are less likely to be monitored by traffic law enforcement, semi-autonomous vehicle controllers and fully autonomous vehicle controllers which can perform route planning, and control the direction and speed of a vehicle and adapt based on environmental conditions.

In the present invention the term "vehicle" refers to both human controlled or automated machine controlled vehicles or combinations thereof. The level of vehicle machine control can range from exclusively human control to fully autonomous and can be categorized into five levels of automation as presented in Table 2.

TABLE 2

Levels of autonomous vehicles.

| Level | Description |
|---|---|
| 0 | No driving automation - Full-time performance by the human driver of all aspects of the dynamic driving task, even when enhanced by warning or intervention systems. |
| 1 | Driver Assistance - system of either steering or acceleration/deceleration using information about the driving environment and with the expectation that the human driver performs all remaining aspects of the dynamic driving task. Examples include: stability control, cruise control, and automatic braking |
| 2 | Partial Driver Automation - The driving mode-specific execution by one or more driver assistance systems of both steering and acceleration/deceleration using information about the driving environment and with the expectation that the human driver performs all remaining aspects of the dynamic driving task. Examples include: adaptive cruise control in combination with lane keeping. |
| 3 | Conditional Driver Automation - The driving mode-specific performance by a machine controlled Automated Driving System of all aspects of the dynamic driving task with the expectation that the human driver will respond appropriately to a request to intervene. |
| 4 | High Automation: The driving mode-specific performance by a machine controlled Automated Driving System of all aspects of the dynamic driving task, even if a human driver does not respond appropriately to a request to intervene. May include machine controlled automated route planning. |
| 5 | Full Automation: The full-time performance by a machine controlled Automated Driving System of all aspects of the dynamic driving task under all roadway and environmental conditions that can be managed by a human driver. Could include fully autonomous unoccupied vehicles. |

In the present invention the term "crowd sourced" refers to contributors of records of encounters with traffic law enforcement and includes human contributors and automated contributors. More specifically, sensors on vehicles can identify encounters with traffic law enforcement and autonomously contribute encounter records.

The historic and predictive traffic law enforcement profiler apparatus preferably utilizes databases of traffic citations, traffic stop, and arrest records maintained by law enforcement agencies including state highway patrols, city and county police departments, municipal courts, state courts, departments of motor vehicles, and in general government or private agencies collective referred to as citations, and preferably includes databases of crowd sourced encounters with traffic law enforcement collectively referred to as encounters to profile and predict the enforcement profile, patterns, locations and schedules where traffic law enforcement agencies patrol. The apparatus provides an indication to a driver when approaching an area where there is a historic or statistically significant chance of encountering traffic law enforcement personnel allowing precaution to be taken such as driving cautiously and within enforced speed limits.

Additionally, the apparatus may also provide the driver with historically significant traffic law enforcement information which may include a maximum estimated speed which it is safe to drive with an acceptably low chance of being cited by law enforcement for violating the speed limit. Additionally, the apparatus preferably may provide the driver with a historical record of traffic law enforcement citations and preferably a set of database processing methods to enable searching, filtering, extracting, statistical processing, and viewing of results preferably including histogram creation, distributions, scatter plots, tables and lists.

A block diagram of a preferred embodiment of the historic and predictive traffic law enforcement profiler apparatus is shown in FIG. 1. As can be seen, the profiler apparatus, 14 preferably consists of a client device 21 and a server resource 3. The client device 21 may further include a historic and predictive processing unit 1, a location determining unit 7, time determining unit 25, direction determining unit 26, velocity determining unit 28, vehicle sensor inputs 27, a historical database 2, real time data base 30, a road map database 15, a traffic flow database 16, a visual display 9, an audible output 8, a user control 10, vehicle control 24 and a network interface 6. The server resource 3 preferably includes a historic database 4, a real time database 5, a traffic flow database 23, a roadway map database 17, a network interface 19, and a predictive processing unit 18. Databases 2, 15, 16, 30, 4, 5, 17, 23 are presented as distinct databases; however, those skilled in the art will recognize that any physical or logical combinations of databases 2, 15, 16, 30, 4, 5, 17, 23 are realizable and considered within the scope of the present invention. Those skilled in the art will also recognize that the user control 10 enables configuration and operation of the profiler apparatus 14, which may include touch, touchscreen or audio/voice user interfaces.

A preferred embodiment of the profiler apparatus 14 includes a client device 21 and a server resource 3. In a more specific preferred embodiment the client device 21 could be implemented as a standalone device and the server resource 3 may preferably not be required. Or in another preferred embodiment the client device 21 could be implemented as a thin device, utilizing server resource 3 for providing databases 4, 5, 17, 23 and historic predictive processing unit 18 through the network interfaces 6, 19 wherein network interfaces 6, 19 could be either wireless or wired and the client device 21 may not require databases 2, 15, 16, 30 or predictive processing unit 1. In an additional preferred embodiment, client device 21 and server resource 3 are both present and share responsibility for providing database content 4, 5, 17, 23, 2, 15, 16 and predictive compute resources 1, 18.

In a preferred portable navigation device embodiment, the client device 21 of the profiler apparatus 14 could be integrated into a standalone portable navigation devices such as a TomTom, Garmin, Magellan, Nuvi or similar road navigation device in which case preferably the client device 21 could use the common resources of the portable navigation device including but not limited to the display 9, audio output 8, location determining unit 7, user control 10, predictive processing unit 1 and local databases 2, 15, 16, 30. To provide access to real time databases and physically separate historical databases and predictive processing resources, the preferred portable navigation device embodiment may also include wired and/or wireless instances of network interfaces 6, 19. Interfaces 6, 19 provide data communication with server resource 3 preferably providing records of traffic law enforcement citations and encounters from real time database 5, historical database 4, traffic flow database 23, and map database 17 and preferably server resource predictive processing unit 18.

In a preferred smart phone or tablet embodiment, the historic and predictive client device 21 could be a smart phone or tablet executing an application which may be interoperating with a web application executing on a web server 3. In the preferred smart phone embodiment, the client device 21 of the profiler apparatus 14 could be integrated with a smart phone or tablet device such as an iPhone, iPad, Google phone, Microsoft Surface tablet or device operating the Android OS, Windows OS, iOS or similar device and could use the common resources of the device preferably including but not limited to the display 9, audio output 8, location determining unit 7, time determining unit 25, direction determining unit 26, velocity determining unit 28, user control 10, predictive processing unit 1 and local databases 2, 15, 16, 30. Additionally, the preferred smart phone or tablet embodiment could optionally utilize wired or wireless network interfaces 6, 19 which could preferably support G3, G4, G5 or other wireless data standards to provide data communication with a server resource 3 preferably providing traffic law enforcement citations and encounters from real time database 5, historical database 4, traffic flow database 23, and map database 17 and preferably server resource predictive processing unit 18. The user control 10 may enable configuration and operation of the profiler apparatus 14. User control 10 may include touch and touchscreen user interfaces, and in addition to or alternatively may include audio/voice user interfaces, utilizing the screen and or audio resources of the smart phone or tablet device. Examples of voice control applications which could be used to configure and control the profiler apparatus 14 may include Amazon Alexa, Google Voice, Apple Siri, and Microsoft Cortana or in general native voice control. User control 10 may also be performed remotely from the server 3, through the network interfaces 6, 19, and the server terminal 31, 815 can enable one or more client devices 21 to be configured and controlled remotely as a federated fleet. Additionally, in the preferred smart phone or tablet embodiment, the client device 21. 102 could perform vehicle control to achieve driver assisted, partial driver automation, conditional driver automation, high automation, or full automation. The camera of the smart phone can function as vehicle sensors 105, 106, 107, 101 which are passed to the predictive processing unit 1 through the vehicle sensor inputs 27. The predictive processing unit 1 can control vehicle 100 speed, direction and navigation/routing though the vehicle control unit 24 which preferably interfaces to the vehicle controller 103 providing command of the vehicle 100 steering or motor systems or any combination thereof.

Additionally, in the preferred smart phone or tablet embodiment, the client device 21 could perform driver assisted functions such as cruise control or adaptive cruise control by controlling the speed of the vehicle 100 to be consistent with the speed determined by the predictive processing unit 1 through the vehicle control unit 24 which preferably interfaces to the vehicle controller 103 providing command of steering or motor systems or any combination thereof. The vehicle control unit 24 preferably interfaces to the vehicle controller 103 utilizing wired or wireless protocols which could include the network interface 6, the computer interface 12, wifi, bluetooth or USB. The smart phone or tablet camera sensor could serve as a vehicle sensor 105, 106, 107, 101 in conjunction with the predictive processing unit 1 through the vehicle sensor inputs 27 to perform adaptive cruise control by slowing the vehicle 100 to maintain a safe distance behind any other sensed vehicles in the path. Additionally, utilizing the smart phone camera sensor 105, 106, 107, 101, vehicle control unit 24, and the vehicle controller 103, the predictive processing unit 1 could also perform partial driver automation, conditional driver automation, high automation, or full automation by controlling the direction of the vehicle 100 to change lanes or pass a slower moving vehicle. Additionally, the smart phone camera sensor 105, 106, 107, 101 in conjunction with the predictive processor 1 could identify and report as crowd sourced records encounters with traffic law enforcement to the client real time database 30 and to the server database 5 utilizing network interface 6 where the records could be shareable with other users. Further, if the predictive processor 1 identifies the location of traffic law enforcement, the predictive processor 1 can control the speed of the vehicle 100 to comply with posted limits or estimated enforcement profiles in addition to controlling the position of the vehicle in a lane that is advantageous to avoid citation. The The predictive processing unit 1 can also receive indications or monitor the client real time database 30 and server real time data base 5 through the network interface 6 to learn of crowd sourced records of encounters with traffic law enforcement. The predictive processing unit 1 can control the speed, direction, and navigation route of the vehicle 100 to comply with posted speed limits, enforcement profiles or traffic law enforcement locations to avoid citation. Additionally the smart phone camera sensor 105, 106, 107, 101 in conjunction with the predictive processing unit 1 can sense identify and interpret roadway signs preferably including speed limit signs, stop signs, and caution signs to interpret the actual posted speed limit.

In a preferred personal computer embodiment, the client device 21 of the profiler apparatus 14 could be a personal computer and the server device 3 could be a web server. In the preferred personal computer embodiment, Client device 21 could use the common resources of the device preferably including but not limited to the computer screen as the display 9, computer speaker output as the audio output 8, location determining unit 7, time determining unit 25, graphical user interface as the user control 10, the central processor unit as the predictive processing unit of the personal computer and local databases 2, 15, 16, 30 which could be on a computer drive. Additionally, the preferred personal computer embodiment could utilize internet network interfaces 6,19 to provide internet data communication with a server resource 3 preferably providing traffic law enforcement encounters from real time database 5, historical database 4, traffic flow database 23, and map database 17 and preferably server resource predictive processing unit 18. Furthermore, the preferred personal computer embodiment could be a web browser or application executing on the personal computer client device 21 with server resource 3 providing predictive processing services in unit 18.

In a thin predictive processor preferred embodiment, databases 2, 15, 16, 30 could be combined into a unified database which contains combinations of pre-computed predicted patrol schedules, and enforcement profiles which may include estimated enforced speed limits, patrol schedules, patrol locations, enforcement profiles, and estimated enforcement austerity, and other properties as defined in Table 1, at a singular or plurality of locations and a map of the roadway system. The plurality of locations would preferably include locations and be limited to within the geographic region of travel. Additionally, the maximum plurality of locations would be limited by the size of the database 2, 15, 16, 30. Typically 10 billion locations could be stored with current client database technologies however, those familiar with the art, would recognize that future database technologies could exist which conceivably support additional locations. Additionally, in this preferred embodiment databases 4, 5, 17, 23 could similarly be combined into a unified database which contains combinations of the predicted enforcement profiles, estimated patrol schedules, estimated enforced speed limits, and estimated enforcement austerity at a singular or plurality of locations and a map of the roadway system. Typically, 100 billion locations could be stored with current server database technologies however, those familiar with the art, would recognize that future database technologies could exist which conceivably support additional locations. In the thin predictive processor preferred embodiment, the predictive processor unit of the client 1, and server 18 could perform access functions to database 2, 15, 16, 30 and 4, 5, 17, 23 respectively, to retrieve any combinations of pattern properties presented in Table 1 including for example the predicted enforcement profiles, estimated patrol schedules, estimated enforced speed limits, and estimated enforcement austerity, at locations of interest and provide indications to the user through the audio 8 and visual 9.

In a preferred machine controlled or automated vehicle embodiment, the client device 21, 102 of the profiler apparatus 14 could be integrated into a vehicle 100. The vehicle 100 could incorporate any level of automation presented in Table 2 including driver assistance, partial driver automation, conditional driver automation, high automation, or full automation (fully autonomous). and could use the common resources of the vehicle 100 preferably including but not limited to the display 9, audio output 8, location determining unit 7, time determining unit 25, direction determining unit 26, velocity determining unit 28, user control 10, predictive processing unit 1 and local databases 2, 15, 16, 30. Additionally, the preferred machine controlled or automated vehicle embodiment can also provide an indication of the historical and or predicted traffic law enforcement profile, schedules and location to computer interface 12 or network interface 6 to provide an indication to another system such as a vehicle integrated navigation system or a vehicle integrated communication system. Additionally, the preferred machine controlled or automated vehicle embodiment, the client device 21, 102 of the profiler apparatus 14 could optionally utilize wired or wireless network interfaces 6, 19 which could preferably support G3, G4, G5 or other wireless data standards to provide data communication with a server resource 3, 104 preferably providing traffic law enforcement citations and encounters from real time database 5, historical database 4, traffic flow database 23, and map database 17 and preferably server resource predictive processing unit 18. The automated vehicle 100 typically has a range of sensors 105, 106, 107, 101 for determining a number of environmental conditions which could include, speed and direction of other vehicles, objects and road hazards such as stalled vehicles, icy weather and slippery road condition, construction zones, school zones, lane closures, posted speed limit signs, posted caution signs, and location, lane position, speed and direction of the vehicle 100. Sensors 105, 106, 107, 101 could interpret posted speed limit signs and posted caution signs to determine the posted speed limit. Sensors 105, 106, 107, 101 could be a GPS, Lidar system, stereo vision system, camera system, machine vision system, Internet Protocol address locating system, radio location system, a Simultaneous localization and mapping (SLAM) system, dead reckoning system, radio location system, real-time locating system (RTLS), radar proximity detection, light field moment imaging or an Inertial Navigation system or any combinations thereof. Sensors 105, 106, 107, 101 could interface to the enforcement profiler client device 21, 102 through the vehicle sensor inputs 27 to provide the functions of the location determining unit 7, time determining unit 25, direction determining unit 26, velocity determining unit 28, The client device 21, 102 may determine any combinations of properties presented in Table 1 including for example the predicted enforcement profiles, estimated patrol schedules, estimated enforced speed limits, and estimated enforcement austerity in addition to real time locations of traffic law enforcement from database 5, 30 to provide vehicle control preferably including any combinations of vehicle speed, direction, route, or navigation route planning through the vehicle control unit 24, which preferably interfaces with the vehicle controller 103 providing command of the vehicle 100 steering or motor or any combinations thereof to improve travel efficiency and decrease probability of citation. For instance, the client device 21, 102 may control speed in conjunction with adaptive cruise control to ensure a vehicle does not violate enforcement profiles such as enforced speed limit. Further, the client device 21, 102 may also control speed to ensure a vehicle complies with the posted or enforced speed limit at real time or predicted patrol locations. In addition, the client device 21, 102 may also preferably control the direction, route, and or navigation route planning of a vehicle to travel on road ways with the highest enforced speed limits or roadways with fewer numbers of estimated patrol locations or real time locations of traffic law enforcement. The Profiler apparatus 14 performs navigation and route planning preferably in conjunction with historic and real time traffic flow rates 16, 23 to estimate the speed at which traffic is currently moving or expected to be moving on the available route options. The client device 21, 102 may also utilize sensors 105, 106, 107, 101 in conjunction with the predictive processor 1 to identify and report crowd sourced records of encounters with traffic law enforcement to the client real time database 30 and to the server database 5 utilizing network interface 6 where the records could be shareable with other users. Further, if the predictive processor 1 identifies the location of traffic law enforcement, the predictive processor 1 can control the speed of the vehicle 100 to comply with posted limits or estimated enforcement profiles in addition to controlling the position of the vehicle in a lane that is advantageous to avoid citation. The predictive processing unit 1 can also receive indications or monitor the client real time database 30 and server real time data base 5 through the network interface 6 to learn of crowd sourced records of encounters with traffic law enforcement. The predictive processing unit 1 can control the speed, direction, and navigation route of the vehicle 100 to comply with posted speed limits, enforcement profiles or traffic law enforcement locations to avoid citation. The user control 10 may enable configuration and operation of the profiler apparatus 14. User control 10 may include touch and touchscreen user interfaces, and in addition to or alternatively may include audio/voice user interfaces, utilizing the screen and or audio resources of the vehicle 100. Examples of voice control applications which could be used to configure and control the profiler apparatus 14 may include Amazon Alexa, Google Voice, Apple Siri, and Microsoft Cortana or in general native voice control. User control 10 may also be performed remotely from the server 3, through the network interfaces 6, 19, and the server terminal 31, 815 can enable one or more client devices 21 to be configured and controlled remotely as a federated fleet. Those skilled in the art will recognize that additional vehicle control scenarios are possible and should be considered within the scope of the present invention.

As can be seen in a preferred embodiment of FIG. 1, the Client device 21 of the Historic and Predictive Processing Unit (HPPU) 1 may accept input from the User Control 10, location determining unit 7, time determining unit 25, direction determining unit 26, velocity determining unit 28, vehicle sensor inputs 27, Weather Monitor 11, and database 2, 15, 16 and 30. The User Control 10, provides a means for a user including a human user or a machine user such as a driver assisted, automated or autonomous vehicle to configure and control the client device 21. The user control 10 may enable configuration and operation of the profiler apparatus 14. User control 10 may include touch and touchscreen user interfaces, and in addition to or alternatively may include audio/voice user interfaces, utilizing the screen and or audio resources of the vehicle 100. Examples of voice control applications which could be used to configure and control the profiler apparatus 14 may include Amazon Alexa, Google Voice, Apple Siri, and Microsoft Cortana or in general native voice control. User control 10 may also be performed remotely from the server 3, through the network interfaces 6, 19, and the server terminal 31, 815 can enable one or more client devices 21 to be configured and controlled remotely as a federated fleet. The Historic and Predictive Processing Unit 1 may provide annunciation output to the Audio Output 8, and Display 9 and also may have coupling to a computer interface 12 and or network interface 6 for interfacing to a server resource 3 for uploading and downloading content from server resource databases 4, 5, 17, 23 and or interacting with server applications running on server predictive processing unit 18. Additionally, the Historic and Predictive Processing Unit 1 may provide navigation route planning and vehicle control preferably including speed control, direction control, and route control or any combinations thereof, through the Vehicle Control Unit 24. Additionally, a user of the client device 21 may upload or add entries as crowd sourced records, to client databases 2, 30 or to server databases 4, 5 using the client device network interface 6 and server network interface 19. Crowd sourced records could be shared with multiple instances of client devices 21. Furthermore, vehicles equipped with sensors such as Lidar, stereo vision, cameras, or machine vision could autonomously identify and report encounters with traffic law enforcement to the client device 21 through the vehicle sensor inputs 27 wherein the encounters would be added as crowd sourced records to client databases 2, 30 or to server databases 4, 5 using the client device network interface 6. The network interface 6 may also enable multiple instances of client devices 21 to communicate with a server resource 3 through network interface 19 which could be wired or wireless. Examples of the server resource 3 could include a web server hosting the predictive processing algorithms application executing on predictive processor 18 which could be the server's central processing unit. In this preferred embodiment server resource 3 could serve web pages containing any combination of real time, historic and or predicted traffic law enforcement patterns, schedules, locations, enforcement profiles defined in Table 1, to client devices 21 or could also be a file server providing client device 21 access to databases 4, 5, 17, 23 which may partially or totally eliminate the need for client device local databases 2, 16, 15, 30. Further, the server resource 3 could include a social media site implementing a protocol such as ActivityPub, and the client devices 21 could support ActivityPub actor protocol to receive real time and predicted traffic law enforcement patrol schedules, locations and enforcement profiles. Additionally, the ActivityPub actor client device 21 could publish real time encounters with traffic law enforcement to the ActivityPub server resource 3. Preferably a plurality of client devices 21 could establish network interfaces 6 to a single instance of server resource 3 through network interface 19, wherein the number of client devices 21 may be limited to less than 10,000,000; however, as the capacity of server resource 3 increases, those skilled in the art would recognize additional client devices 21 could communicate with a server resource 3. Additionally, a network of client devices 21 could establish communications with each other through their respective network interface 6 preferably enabling multiple client devices 21 to share respective databases 2, 15, 16, 30 with other client devices 21 preferably forming a distributed database and possibly eliminating the need for server resource 3. Similarly, a plurality of server resources 3 could establish network interfaces with each other through their respective network interfaces 19 preferably enabling multiple server resources 3 to share respective databases 4, 5, 17, 23 with other server resources 3 preferably forming a distributed database, wherein the number of server resources 3 may be limited to less than 10,000,000; however, those skilled in the art will recognize additional server resources 3 could be included as network 19 capacities are increased.

The Location Determining Unit 7 may preferably provide the current location, speed, direction of travel, date and time. The location determining unit 7 could be realized using Global Positioning (GPS) technology, a GPS receiver, and it is well known that speed, direction of travel, date, and time can be derived from GPS data. Additionally, the location determining unit 7 could be a GPS, Lidar system, stereo vision system, camera system, machine vision system, Internet Protocol address locating system, radio location system, a Simultaneous localization and mapping (SLAM) system, dead reckoning system, radio location system, real-time locating system (RTLS), radar proximity detection, light field moment imaging, or an Inertial Navigation system or any combinations thereof. Other location determining systems could also be used to implement the location determining unit 7 and should be considered within the scope of the present invention. The time determining unit 25 could be a quartz based real time clock, network time protocol synchronized digital clock, or a GPS receiver that provides time and date. Other time determining systems could also be used to implement the time determining unit 25 and should be considered within the scope of the present invention. The velocity determining unit 28 could be a speedometer, GPS receiver that differentiates location over time, or an inertial measuring unit that determines speed. Other velocity determining systems could also be used to implement the velocity determining unit 28 and should be considered within the scope of the present invention. The direction determining unit 26 could be a digital compass, GPS receiver that differentiates location over time, or an inertial measuring unit that determines direction. Other direction determining systems could also be used to implement the direction determining unit 26 and should be considered within the scope of the present invention. Utilizing the current position, time of day, speed and direction of travel provided by the Location Determining Unit 7 or the time determining unit 25, velocity determining unit 28, direction determining unit 26, the HPPU 1, 18 may access the historical database of traffic law enforcement citation and encounter records 2, 4 and real time database 5, 30 of current traffic law enforcement location, citation and encounter records, and statistically profile and predict any combination of properties in Table 1 which includes the locations, schedules and enforcement profiles of traffic law enforcement patrols. Alternatively or additionally, the historical databases 2, 4 and real time database 5, 30 may contain any combination of previously computed properties in Table 1 which include combinations of predicted locations, schedules and enforcement profiles of traffic law enforcement patrols, collectively referred to as predictive record, in which case the HPPU 1, 18 may access the database 2, 4, 5, 30 to retrieve the predicted locations, schedules, and enforcement profiles of traffic law enforcement. Additionally, the HPPU 1 can provide a visual representation of the historical and or predicted traffic law enforcement profile, schedules and locations to the display 9 and can also provide an acoustic representation of said historical and or predicted traffic law enforcement profile, schedules, and location information to the Audio Output 8. The Audio Output 8 preferably in conjunction with the user control 10, may enable the Client Device 21 to support voice user interface driven applications which could include Amazon Alexa, Google Voice, Apple Siri, and Microsoft Cortana or in general native voice annunciations. HPPU 1 can also provide a visual representation of the historical and or predicted traffic law enforcement profile to the display 9 combined with a map of the roadway preferably provided by client device database 15 and or server resource database 17. The HPPU 1 can also provide an indication of the historical and or predicted traffic law enforcement profile, schedules and location to computer interface 12 or network interface 6 to provide an indication to another system such as a vehicle integrated navigation system or a vehicle integrated communication system. The HPPU 1 can also utilize the vehicle controller unit 24 to control the vehicle preferably including any combinations of vehicle speed, direction, route, or route planning.

Vehicle telemetry preferably including vehicle speed, location, direction, and time can be observed by the HPPU 1 from the Velocity Determining Unit 28, Location Determining Unit 7, Direction Determining Unit 26, and Time Determining Unit 25 respectively. The HPPU 1 may store vehicle telemetry in client Traffic Flow Database 16 and or in server Traffic Flow Database 23 by utilizing Network Interfaces 6, 18. The Traffic Flow Databases 16, 23 may contain real time and historic telemetry for a plurality of vehicles which could be up to 100,000,000 vehicles but those skilled in the art will recognize the Traffic Flow Databases 16. 23 could be scaled to accommodate additional telemetry records. The HPPU 1, 18 may access the vehicle telemetry stored in the Traffic Flow Databases 16, 23 to infer traffic flow rates. The HPPU 1 preferably may perform navigation route planning utilizing real time and historic traffic flow rates from the Traffic Flow databases 16, 23 in conjunction with predicted traffic law enforcement patrol schedules, locations and enforcement profiles and the Roadway Map Database 15, 5 to determine an efficient route. The HPPU 1, 18 performs navigation and route planning preferably in conjunction with historic and real time traffic flow rates 16, 23 to estimate the speed at which traffic is currently moving or expected to be moving on the available route options.

Additionally, crowd sourced road conditions which preferably may include the locations of road hazards, slippery road conditions, accidents, lane closures, construction zones, and slow traffic can be provided to the HPPU 1 using the user control 10 or automatically detected from vehicle sensor inputs 27. The HPPU 1 preferably can store the road conditions to the client traffic flow database 16 or the server traffic flow database 23 through the Network Interfaces 6, 19. Traffic Flow Databases 16, 23 may contain real time and historic road condition entries for a plurality of vehicles which could be up to 100,000,000 vehicles but those skilled in the art will recognize the Traffic Flow Databases 16. 23 could be scaled to accommodate additional telemetry records. The HPPU 1 preferably may perform navigation route planning utilizing real time and historic road conditions from the Traffic Flow Databases 16, 23 in conjunction with predicted traffic law enforcement patrol schedules, locations and enforcement profiles and the Roadway Map Database 15, 5 to determine an efficient route. Further, the HPPU 1 preferably utilizes real time road conditions from the Traffic Flow Databases 16, 23 to generate an alert using the Audio Output 8, or Display 9 take precautionary action in addition to information regarding the hazard, when approaching a location identified as a hazard. If the vehicle 100 incorporates driver assist features the HPPU 1 can notify the vehicle control unit 24 to take precautionary measures such as slowing the vehicle 100 or changing lanes to avoid the hazard.

The HPPU 1, 18 preferably can also utilize traffic flow rates provided by client device traffic flow database 16 and or server resource traffic flow database 23 at a given location to determine traffic velocity and density as a function of time and location. Traffic flow databases 16 and 23 preferably contain historic and real time measured traffic volume and or velocity at given locations and associated times. Utilizing historic and real time an historic traffic volume and velocity from databases 16 and or 23 and real time and historic encounter databases 2 and or 4, the HPPU 1, 18 can determine combinations of traffic law enforcement austerity properties presented in Table 1.

More specifically, the HPPU 1, 18 can preferably determine the Enforcement Leniency Profile of Table 1 which provides an indication of traffic law enforcement patterns for issuing citation warnings verses citations. The HPPU 1, 18 may determine the Enforcement Leniency Profile for locations and time intervals of interest by utilizing database citation records 2, 4, 5, 30 to determine the ratio or magnitude of citation warnings verses citations at locations and time frames as a function of violation type. The Enforcement Leniency Profile provides an indication of how rigidly different types of violations are enforced. Additionally, the HPPU 1, 18 can preferably determine the Speed Limit Enforcement Austerity Relative to Average Traffic Flow Velocity also in Table 1 which provides a measure of the enforced speed limit relative to the average flow velocity of traffic. Speed Limit Enforcement Austerity Relative to Average Traffic Flow Velocity can be determined by the HPPU 1, 18 by determining the difference between traffic flow velocity from real time and historic traffic flow database 16, and 23 to traffic law enforcement issued citation velocities from real time and historic citation and encounter databases 2, 4, 5, 30 at given locations and times.

The HPPU 1, 18 can determine the Location Enforcement Austerity Relative to Average Traffic Volume of Table 1, which quantifies the patrol location patterns as a function of traffic volume and provides an indication as to which locations are patrolled more frequently under specific traffic volume conditions and times. The HPPU 1, 18 can determine the Location Enforcement Austerity Relative to Average Traffic Volume by utilizing the historic traffic speed and density 16, 23 to determine the probability of a vehicle having an encounter with traffic law enforcement at a given time and location and the probability at each location could provide a relative indication of the location patrol intensity or equivalently the relative amount a location is patrolled. Alternatively, if historic traffic speed and density 16,23 are not utilized, the location patrol intensity could be approximated as the location citation density which quantifies the number of citations issued within a location and time interval. The location citation density may be interpreted relative to other locations within the region to provide an indication of relative location patrol intensity. Additionally, the HPPU 1, 18 can preferably determine the Speed Limit Enforcement Austerity Relative to Average Traffic Flow Volume, presented in Table 1, which provides a measure of the enforced speed limit relative to the average flow volume of traffic. Speed Limit Enforcement Austerity Relative to Average Traffic Flow Volume can be determined at a location by the HPPU 1, 18 by determining the historic estimated enforced speed limit from databases 2,4,5,30 as presented in Table 1, at the location as a function of traffic flow volume provided by database 16, 23, and then inferring the enforced speed limit as the historic estimated enforced speed limit at said location with similar traffic flow volume.

Alternatively or additionally, combinations of the predicted traffic law enforcement patrol schedules, locations and enforcement profiles, including enforced speed limits and enforcement austerity characteristics can be previously computed and stored in databases 2, 4, 5, 30 at said given locations and times and the HPPU 1, 18 may access the database 2, 4, 5, 30 to retrieve the predicted traffic law enforcement patrol schedules, locations and enforcement profiles, including enforcement austerity and enforced speed limit and combinations thereof. Additionally, the HPPU 1 can provide a visual representation of combinations of the historical and or predicted patrol locations, schedules, enforcement profiles, and austerity of traffic law enforcement to the display 9 and can also provide an acoustic representation of said historical and or predicted locations, schedules, enforcement profiles, and austerity to the Audio Output 8. HPPU 1 can also provide a visual representation of the historical and or predicted traffic law enforcement patrol locations, schedules, enforcement profiles, austerity and combinations thereof, to the display 9 combined with a map of the roadway preferably provided by client device database 15 and or server resource database 17. Further the HPPU 1 can use real time, historical and or predicted traffic law enforcement patrol locations, schedules, enforcement profiles, austerity and combinations thereof, and the vehicle control unit 24, which preferably interfaces with the vehicle controller 103 providing command of the vehicle 100 steering or motor systems or any combinations thereof, preferably including any combinations of vehicle speed, direction, route, or navigation route planning. For instance, the HPPU 1 may control speed in conjunction with adaptive cruise control to ensure a vehicle does not violate enforcement profiles such as enforced speed limit. Further, the HPPU 1 may also control speed to ensure a vehicle complies with the posted or enforced speed limit at real time or predicted patrol locations. Further the HPPU 1 may include a rules engine to control the speed, route and route planning of the vehicle 100. The rules engine preferably contains a list of rules configured through the user control 10 which define maximum speed limits either relative to any commination of the enforcement profile enforced speed limit, real time and or historic traffic flow rates provided by Traffic Flow Database 15, 23, or the posted speed limit at which the vehicle 100 can travel in various locations such as school zones, construction zones, crowd sourced real time locations of traffic law enforcement, normal road condition zones, or locations where crowd sourced road conditions are identified in the Traffic Flow Databases 16, 23. As a further example the rules engine may define a vehicle 100 should never travel above 10 miles per hour above the posted speed limit unless of an emergency regardless of the enforcement profile enforced speed limit. In addition, the HPPU 1 may also control the direction and or route of a vehicle 100 to travel on road ways with the highest enforced speed limits or roadways with the fewest numbers of estimated patrol locations. Those skilled in the art will recognize that the HPPU 1 could utilize artificial intelligence algorithms and machine learning algorithms to process real time, historical and or predicted traffic law enforcement patrol locations, schedules, enforcement profiles, austerity and combinations thereof to provide vehicle control through the vehicle control unit 24, which preferably interfaces to the vehicle controller 103 providing command of the vehicle steering or motor systems or any combinations thereof, to improve travel efficiency and decrease probability of citation, and additional vehicle control scenarios should be considered within the scope of the present invention.

Databases 2, 4, 5, 30 may contain combinations of previously computed predicted locations, schedules and enforcement profiles of traffic law enforcement, historical records and real time records derived from citations which were issued by traffic law enforcement agencies and or crowd sourced encounters with traffic law enforcement collectively referred to as citations or encounters in the present invention. Records derived from issued traffic law enforcement citations are typically considered more reliable than crowd sourced records and generally public information and are preferably compiled and maintained by law enforcement and government agencies and said agencies preferably include but are not limited to State Highway Patrols, City and County Police agencies, Department of Motor Vehicles and Municipal Courts. Data bases 2, 4, 5, 30 could also contain crowd sourced citations or encounters with traffic law enforcement contributed by individuals. Databases 2, 4, 5, 30 could contain an entry for each issued citation or encounter but could be in various compressed formats to improve storage efficiency. Each entry of databases 2, 4, 5, 30 preferably may contain a combination of the fields similar to those presented in Equation 1 for the record format; however, a subset of said fields may be available per record or additional fields such as vehicle type, or color could be present in each record. Additionally, different means could be used to compress the databases 2, 4, 5, 30 entries to improve storage efficiency. Equation 1, demonstrates a preferred content representation of each record in database 2, 4, 5, 30 derived from citation records.

$$\text{record\_entry} = \{\text{location, time, date, direction, type, violation\_speed}\}$$

Equation 1. Preferred citation and encounter record properties and members of database Equation 1 record properties may also be referred to as members or events of said record. Said record member: location is preferably the location where the violation was observed and the citation issued. Said location field is preferably in latitude and longitude units; however, it could additionally be reported by but not limited to mile post marker, crossroads location, or street address. Said record member: time and date are preferably the time and date at which the encounter occurred or citation was issued, time could include both the time and date. Said record member: direction is preferably the direction of travel at which time the encounter or citation was issued. Said record member: type is preferably the type of encounter or citation which may include speeding, expired registration and other infraction types or could be the reason for traffic law enforcement stopping vehicle. Said record member: speed preferably represents the speed of the vehicle when a speeding citation was issued or could also represent the velocity which would specify both the speed and direction. Crowd sourced records of encounters with traffic law enforcement can also be stored in databases 2, 4, 5, 30 in a representative format of Equation 1, wherein crowd sourced data may be a sighting encounter of traffic law enforcement such that possibly only location, time and direction might be present in the record entry Equation 1.

Furthermore, in another preferred embodiment, databases 2, 4, 5, 30 could contain predicted traffic law enforcement properties and patterns at locations and times, derived from processed citation records similar to Equation 1, preferably including a combination of the properties defined in Table 1, and represented in Equation 1 a. Those skilled in the art will recognize that additional enforcement characteristics and predicted profile properties could be derived from traffic law enforcement citation records and crowd sourced encounters with traffic law enforcement and stored in databases 2, 4, 5, 30 and should be considered within the scope of the present invention. Equation 1 a, demonstrates a preferred format representation of each entry of database 2, 4, 5, 30 containing predictive entries. Said predictive_record_entries of Equation 1a preferably contain any combination of traffic law enforcement properties presented in Table 1.

$$\text{Predictive\_record\_entry} = \{\text{location, patrol schedule, patrol location, location patrol intensity, enforcement profile}\}$$

Equation 1 a. A preferred post processed predictive database record format. Reference Table 1 for definition of predicted traffic law enforcement properties and patterns.

Most state and city departments of transportation monitor and report historical and current traffic flow volume and rate information for roadways. Client device 21 preferably incorporates a traffic flow data base 16 which preferably contains records of historic traffic flow volumes and or historic traffic velocities at locations verses time. Additionally, server resource 3 may contain a traffic flow and velocity database 23. Databases 16 and 23 may contain real time and or historic traffic flow records. Vehicle telemetry preferably including vehicle speed, location, direction, and time can be observed by the HPPU 1 from the Velocity Determining Unit 28, Location Determining Unit 7, Direction Determining Unit 26, and Time Determining Unit 25 respectively. The HPPU 1 may store vehicle telemetry in client Traffic Flow Database 16 and or in server Traffic Flow Database 23 by utilizing Network Interfaces 6, 18. The Traffic Flow Databases 16, 23 may contain real time and historic telemetry for a plurality of vehicles which may provide the traffic flow volume and rate. The HPPU 1, 18 can preferably utilize the traffic rate and volume from databases 16, 23 to determine the probability of a vehicle having an encounter with traffic law enforcement at a given time and location and the probability at each location preferably provides a relative indication of patrol locations. Additionally, HPPU 1, 18 can preferably determine the enforced speed limit relative to the rate and flow of traffic by comparing the traffic speed from databases 16, 23 to traffic law enforcement issued citation speeds from databases 2, 4, 5, 30 at given locations and times. Preferably HPPU 1, 18 can compare the traffic flow rate with speeding citation issued speeds and determine the estimated speed at which traffic law enforcement issues citations at given times and locations relative to the average traffic rate and or may determine the austerity with which traffic law enforcement enforces the speed limit relative to average traffic rates and volumes at given locations and times. Equation 2 demonstrates a preferred traffic flow entry format of databases 16, 23.

traffic_flow_entry={location, volume, velocity, time}

Equation 2. A preferred traffic flow entry format

Said location field of Equation. 2 is preferably in latitude and longitude coordinate units and the volume preferably represents the number of vehicles per second travelling through the location at said time and with the average said velocity.

In a preferred embodiment, the HPPU 1, 18 utilizes traffic flow and rate historical and real time records 16, 23 to enable improved prediction of traffic law enforcement speed traps, speed cameras and or patrol locations and or austerity of enforced speed limits relative to the natural flow of traffic. More specifically, in a preferred embodiment the HPPU 1, 18 may determine the relative intensity of patrols at given locations as the relative ratio of issued traffic citations to traffic volume at said given locations. In a preferred embodiment the HPPU 1, 18 may determine the location of estimated speed traps and speed cameras as locations with relative ratios of issued traffic citations to traffic volume that exceed a threshold relative to the ratios of issued traffic citations to traffic volume in surrounding areas. Furthermore, in a preferred embodiment the HPPU 1, 18 may compute the schedule of speed traps, speed cameras, and or the schedule of patrol locations by determining said ratios of issued traffic citations to traffic volume at historic times and locations and then cross correlating said ratios as a function of time to identify patrol schedules which are time correlated. Those skilled in the art will realize the austerity of enforced speed limits at corresponding locations and the locations of predicted speed traps could be computed antecedently and contained within databases 2, 4, 5, 30 and the HPPU 1, 18 could retrieve austerity of enforced speed limits and locations of predicted speed traps and speed cameras from databases 2, 4, 5, 30.

Additionally, in a preferred embodiment HPPU 1, 18 may utilize the difference between the traffic flow average velocity from database 16, 23 at locations and the velocities at which citations have been issued at said locations from databases 2, 4, 5, 30 and determine an indication of speed limit enforcement profile and austerity relative to traffic flow velocities. Furthermore, in a preferred embodiment the HPPU 1, 18 may estimate the schedule of speed limit austerity relative to traffic flow velocities by determining the difference between the historic traffic flow average velocity 16, 23 at locations and times and the velocities at which historic citations have been issue at corresponding locations and times from database 2, 4, 5, 30. Said differences are then cross correlated as a function of time to identify speed limit traffic law enforcement austerity at corresponding locations which are time correlated and thus estimate future speed limit enforcement profile austerity. Those skilled in the art will realize the austerity of enforced speed limits relative to traffic flow average velocities and volumes at corresponding locations could be computed antecedently and contained within databases 2, 4, 5, 30 and the HPPU 1, 18 could retrieve austerity of enforced speed limits relative to traffic flow rates from databases 2, 4, 5, 30.

In a preferred embodiment the HPPU 1, 18 can determine an optimal driving route to maximize travel speed and minimize the probability of receiving a citation by utilizing the ratio of traffic volume 16, 23 verses traffic citation density 2, 4, 5 at locations along optional routes to determine an optimal route which maximizes the said ratio and minimizes the travel travel time. Further, the HPPU 1, 18 can utilize the estimated enforced speed limits, patrol schedules, patrol locations, enforcement profiles from databases 2, 30, 4, 5 and roadway map databases 15, 17, and preferably the time 25 to determine an optimal driving route between starting and ending locations to minimize travel time and minimize probability of receiving a citation.

Traffic law enforcement encounters and citations may be reported based on the milepost marker or address thus, databases 2, 4 preferably could contain entries for mapping Mile Post Marker to latitude and longitude coordinates, and street address latitude and longitude coordinates.

coordinate={location by mile post, street address, lat-long}

Equation 3. Mile Post, address to latitude and longitude example entry format

Figure 7:
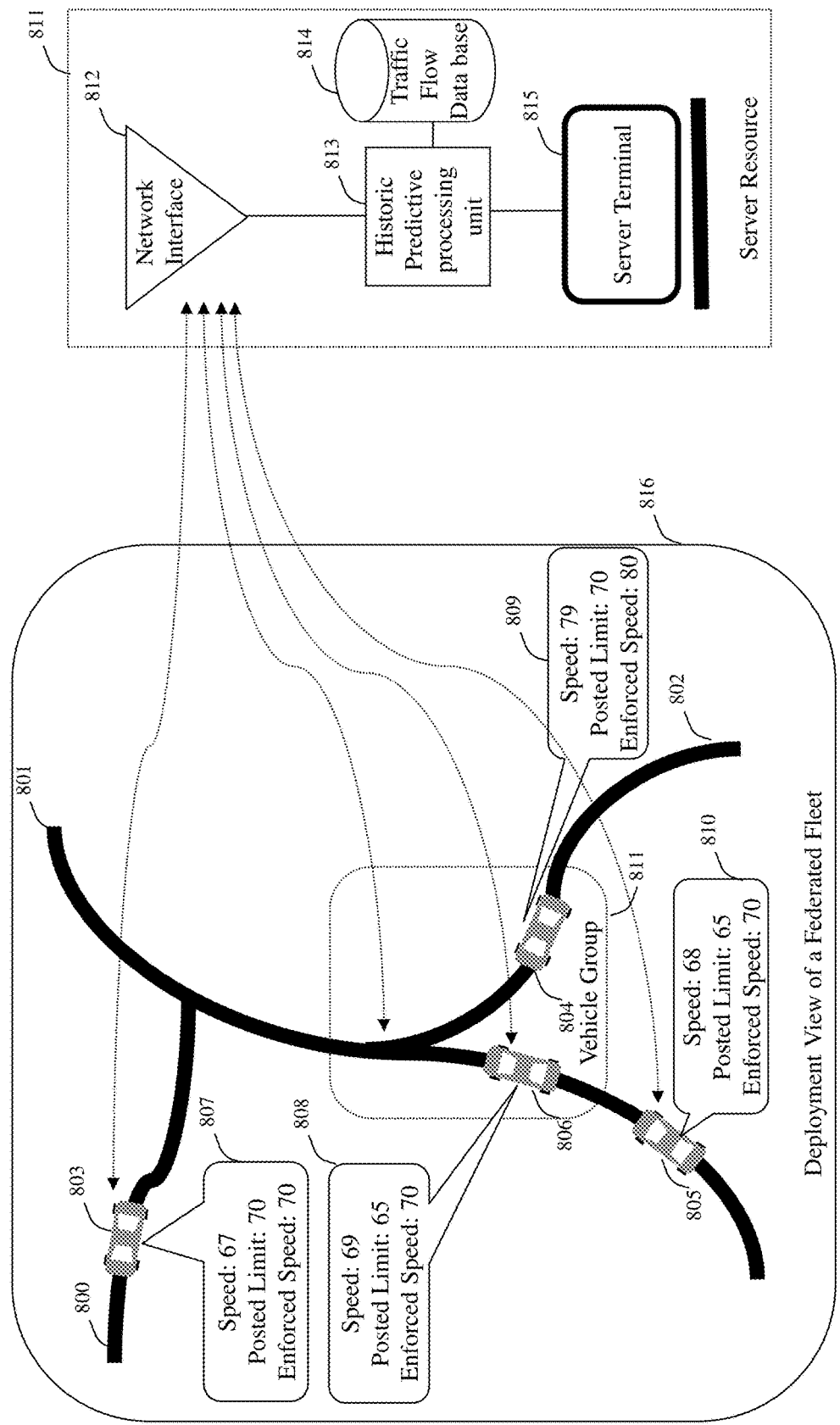
FIG. 7 A diagram showing a federated fleet management of vehicles

FIG. 7 shows a preferred deployment view 816 of a federated fleet of vehicles 803, 804, 805, 806 equipped with Client Devices 21 to provide and or utilize enforcement profiles which preferably includes estimated enforced speed limits, patrol schedules, patrol locations, enforcement profiles, and real time locations of traffic law enforcement or any combinations thereof. The vehicles 803, 804, 805, 806 communicate with server resource 3, 811 using Network Interfaces 6, 19, 812. The federation of vehicles 803, 804, 805, 806 may provide telemetry to the Traffic Flow Database 23, 814 which can be visualized as 807, 808, 809, 810 where each vehicles speed, posted limit and enforced limit is provided. Server terminal 815 preferably provides a means to visualize the deployment view 816, and to enable centralized control to push policies to the HPPU 1 rules engine of each Client Device 21 in each of the vehicles 803, 804, 805, 806 utilizing network interfaces 6, 19, 812. Each of the vehicles 803, 804, 805, 806 could support a different level of automation including driver assistance, partial driver automation, conditional driver automation, high automation, or full automation;

however, the server resource 811 can centrally monitor and define rules engine policy to control a fleet of vehicles. A subset of vehicles 804, 806 can be grouped into a vehicle sub-group/broadcast domain. 811 which can further have unique rules engine policies applied with respect to the remainder of the fleet 803, 805. In addition to the server resource 3, 811 deployment view 816 each vehicle 803, 804, 805, 806 could also retrieve the telemetry data from the Traffic Flow Database 23, 814 to visualize the deployment view 816. It is also preferable to enable vehicles 803, 804, 805, 806 to send voice, data, text, or video messages between members or subgroups of the federation 803, 804, 805, 806 using the Network Interfaces 6, 19, 813 and to also communicate with social media sites such as ActivityPub wherein vehicles 803, 804, 805, 806 could be actors and server resource 3, 811 could be an ActivityPub server. It is preferable for members of a subgroup of federated vehicles 803, 804, 805, 806 to have group chats, group texts, group video capabilities between members by utilizing the profiler apparatus 14. While ActivityPub was used as the social media protocol in this example, those skilled in the art will realize other social media sites and protocols could be accessible by federated vehicles 803, 804, 805, 806. Additionally, the roads 800, 801, 802 of the deployment view 816 could be color coded to reflect an aspect of the enforcement profile such as the enforcement intensity. Similarly the real time and historic traffic flow rate could be encoded or overlayed on the roadways 800, 801, 802 to communicate the traffic flow rates relative to the posted speed limits.

Figure 2:
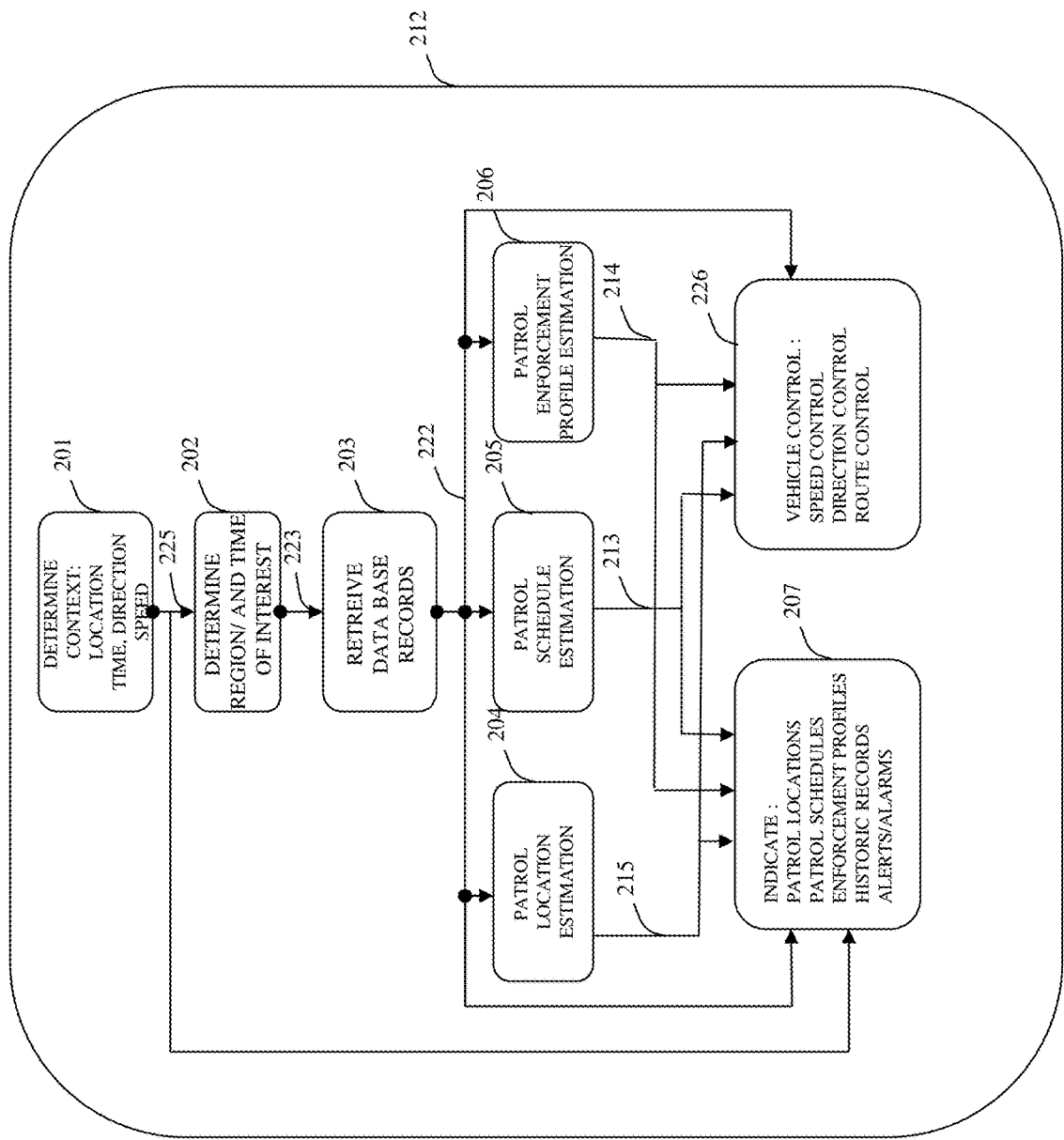

FIG. 2 shows a preferred method 212, for profiling traffic law enforcement. The objectives of method 212 may include combinations of predicting the likely traffic law enforcement patrol locations, schedules, enforcement profiles, speed trap locations, red light camera locations, speed camera locations, enforcement austerity, enforcement histograms, maximum driving speed to avoid citation and are summarized in Table 1. Further objectives of method 212 may include providing historical and real time records of traffic patrol and traffic enforcement citations and encounters. Further objectives of method 212 may include utilizing traffic law enforcement patrol locations, schedules, and enforcement profiles in Table 1 to control a vehicles speed, direction, route, or any combinations thereof to improve travel efficiency while decreasing the probability of citation. Method 212 could be implemented by a preferred embodiment of the traffic law enforcement profiler apparatus 14. More specifically, in a preferred embodiment, method 212 could be implemented on the client device 21 or in combination with server resource 3 or in combination with a plurality of client devices 21 or a plurality of server resources 3. Said plurality of client devices 21 and plurality of server resources 3 could be limited to 10 million, but those skilled in the art will recognize that the limitations of the plurality of client devices 21 and server resources 3 could utilize the cellular networks, wireless data networks, internet or other broadband network which could scale to support greater than 10 million devices 21 and servers 3.

In the preferred method 212, context operation 201 may determine current location coordinates, time, date, direction and speed 225 and combinations thereof from the location determining unit 7. Operation 202 preferably determines the geographical region and historic time period of interest which preferably results in location coordinates defining the boundaries of the region and historic time intervals 223, said boundaries are preferably in the range of 100 feet to 5000 miles. Said historic time intervals preferably may extend 20 years into the past relative to current time; however, those skilled in the art will recognize the historic time intervals 223 could extent to the duration for which records were maintained and should be considered within the scope of the present invention. Furthermore, the historic time intervals 223 could actually extend into the future relative to current time preferably 20 years for retrieving records which may include estimated and predicted patrol schedules, patrol locations, enforcement profiles, and properties presented in Table 1, and combinations thereof.

The database retrieve operation 203, preferably utilizes the regions and times of interest 223 to access the historical databases 2, 4 and real time database 5, 30 to retrieve a plurality of records derived from traffic law enforcement citations and encounters, and records of estimated and predicted patrol schedules, patrol locations, and enforcement profiles and combinations thereof 222. The plurality of records 222 is preferably limited to the records in the region and time interval of interest 223 and is typically less than 100 million records but those skilled in the art will recognize as the length historical records databases increase and the region of interest increases, the number of records may also increase and should be considered within the scope of the present invention. The plurality of records 222 may consist of record entries similar to Equation1, Equation 1 a, and Table 1 and any combinations of the individual subfields thereof, referred to as database entry (dbe). Other options for storing the content or dbe records in historical databases 2, 4 and 5, 30 are possible which may be more efficient and should be considered within the scope of the present. Additionally or alternatively, databases 2, 4, 5, 30 may store dbe records which may be predicted traffic law enforcement property fields in Table 1 and combinations thereof. Storing predicted enforcement profiles, locations and schedules of traffic law enforcement provides the benefits of reduced processing requirements of the HPPU 1, 18 and reduced database 2, 4, 5, 30 sizes. Additionally, in a preferred embodiment the database retrieve operation 203 may retrieve a plurality of historic traffic flow volume and velocity database 16, 23 records and roadway map database 15,17 entries, for the region and timeframe of interest 223, and provide on 222.

In a preferred embodiment, predicted traffic law enforcement patrol locations can be determined by the patrol location estimator operation 204, predicted traffic law enforcement schedules can be determined by the patrol schedule estimator operation 205, and estimated enforcement profile can be determined by the patrol profile estimator operation 206 by utilizing the dbe 222, and optionally the traffic flow and map database entries 222.

In a preferred embodiment, operations 204, 205, 206 may all be present; however, in other preferred embodiments any combination or subset of operations 204, 205 and 206 may be present. Operations 204, 205, 206 preferably process the plurality of historical and real time data base entries 222 provided from databases 2,4,5,30,16,23 to produce statistical estimates of past and present patrol locations in operation 204, estimates of schedules in operation 205 and enforcement profiles in operation 206, and time extrapolate statistical estimates to produce predicted patrol locations 215 in operation 204, patrol schedules 213 in operation 205 and enforcement profiles 214 in operation 206.

The Indication operation 207 may accept and present any combination of the predicted patrol schedules 213, locations 215, profiles 214, database records 222, and current location, date, time and velocity 225 of apparatus 14. Additionally, Indication operation 207 may enunciate an audio or visual indication or alarm if apparatus 14 location and velocity 225 is approaching predicted patrol locations 215 or is within predicted patrol schedules 213 with historical patrol location or historical patrol schedule correlation. Additionally, Indication operation 207 may enunciate an audio or visual indication or alarm if the apparatus 14 location, time and velocity 225 are approaching a location with a statistically significant chance of encountering traffic law enforcement as indicated by the predicted patrol location 215 and with a predicted patrol schedule 213 and combinations thereof.

The vehicle control operation 226 may accept any combinations of the predicted patrol schedules 213, locations 215, enforcement profiles 214, database records 222, and current location, date, time, direction and velocity 225 of apparatus 14. Additionally, the vehicle control operation 226 may control a vehicles speed, direction, route, or any combinations thereof to improve travel efficiency while decreasing the probability of citation. More specifically, the vehicle control operation 226 may control speed in conjunction with adaptive cruise control to ensure a vehicle does not violate enforcement profiles such as enforced speed limit at a given location. The vehicle control operation 226 may also control speed to ensure a vehicle complies with the posted or enforced speed limit at real time or predicted patrol locations. The vehicle control operation 226 may also control the direction and or route of a vehicle to travel on road ways with the highest enforced speed limits or roadways with the fewest numbers of estimated patrol locations to reduce travel time. Those skilled in the art will recognize that the vehicle control operation 226 could utilize artificial intelligence algorithms and machine learning algorithms to process patrol schedules 213, locations 215, enforcement profiles 214, database records 222, and combinations thereof to provide vehicle control to improve travel efficiency and decrease probability of citation, and additional vehicle control scenarios should be considered within the scope of the present invention.

In another preferred embodiment, operation 203 may provide records of historic citation and encounter records to operation 207, over the region of interest 223, which may present the historical citation information 222. Additionally, any combination of record fields of Equation 1, 1a or Table 1 maybe be presented by operation 207. In a preferred embodiment the traffic enforcement profiler method 212 provides historic traffic law enforcement data 222. From the presented historic data 222, a user could preferably interpret, and or estimate patrol locations, schedules and enforcement profile including enforced speed limits. Those skilled in the art will recognize the historic records 222 could further be filtered by a user and the properties the records could be visually encoded to communicate the enforcement profile and should be considered within the scope of the present invention.

Estimating Patrol Locations, Schedules, and Enforcement Profiles of Traffic Law Enforcement In a preferred embodiment of the present invention, apparatus 14 may utilize the principles of statistical analysis and probability theory in estimating the properties of traffic law enforcement presented in Table 1. In particular, traffic law enforcement properties of Table 1 may be modeled as a stochastic process and the predicted patrol locations, schedules and enforcement profiles could be considered random variables. Records derived from historic traffic law enforcement citations and encounters can be considered events of the underlying stochastic process and utilized to estimate the probability distribution of patrol locations, schedules, patrol profiles and the properties presented in Table 1 to provide a historical characterization of traffic law enforcement properties as a function of time and location. Additionally, the historic records of traffic law enforcement citations and encounters may be utilized to probabilistically predict the locations, schedules, patrol profiles, and properties of Table 1 of traffic law enforcement.

In a preferred embodiment, properties including those of Equation 1, derived from issued citations and encounters, which can be considered events of the traffic law enforcement stochastic process, may be correlated to estimate the statistical relationship and dependencies between said properties and enable predicting current or future events of traffic law enforcement which may include patrol locations, schedules and enforcement profiles. Correlation refers to any statistical relationship between two or more random variables or sets of events from a stochastic process. Equation 4a presents a general algorithm implemented by a preferred embodiment of apparatus 14. Equation 4a may determine the correlation between a plurality of random variables $X_1$, $X_2$, $X_N$, wherein $\mu_N$ represents the mean of the associated random variable and $\sigma_N$ represents the variance of the associated random variable. E is the expected value operator. Random variables $X_1$, $X_2$, $X_N$ of traffic law enforcement may include patrol locations, schedules, enforcement profiles and properties of presented in Table 1 and Equation 4a, may determine the correlation and hence statistical predictability of patrol locations, schedules, and enforcement profiles.

$$\rho_{X_1, X_2 \ldots X_N} = \operatorname{corr}(X_1, X_2 \ldots X_N) = \frac{E[(X_1 - \mu_{X_1})(X_2 - \mu_{X_2}) \ldots (X_N - \mu_{X_N})]}{\sigma_{X_1} \sigma_{X_2} \ldots \sigma_{X_N}}$$

Equation 4a. A preferred multi-variable correlation method to predict events of traffic law enforcement.

Equation 4a1 may utilize a plurality of observed events $C_1$, $C_2$, $C_N$ of random variables $X_1$, $X_2$, $X_N$ to determine the sample correlation which approximates the correlation of Equation 4a, which may statistically predict patrol locations, schedules and enforcement profiles.

$$\rho_{X_1 X_2 \ldots X_N} \approx r_{C_1 C_2 C_N}(\tau_1, \ldots \tau_N) = \int_{\varphi} C_1(\varphi) C_2(\tau_1 + \varphi) C_N(\tau_1 + \tau_N + \varphi) d\varphi$$

Equation 4a1. A preferred multi-variable sample correlation method to predict events of traffic law enforcement Equation 4a1 is presented in continuous integral form; however, discrete versions of Equation 4a1 are also possible and should be considered within the scope of the present invention. In Equation 4a1, the plurality of observed events $C_1$, $C_2$, $C_N$ could be derived from encounters and citations of traffic law enforcement 222 and the properties associated with each citation as presented in Equation 1. The $\varphi$ operator may represent the variable to perform correlation over and could be any combination of time, location, citation speed, citation type or any combination of properties of Equation 1. $\tau_1$, $\tau_N$ may be considered the plurality of functions for which the correlation is computed and could also be any combination of time, location, citation speed, and any combination of properties of Equation 1. Relative maximum in the correlation result Equation 4a1, may be identified as periodic patrol properties as a function of $\tau_1$, $\tau_N$ and could be time extrapolated into the present or future to predict events of traffic law enforcement including patrol locations, schedules, enforcement profiles and the properties provided in Table 1.

Statistical analysis of the properties of event records, derived from issued citations and encounters of traffic law enforcement, preferably including the properties of Equation 1, can be utilized for characterizing the properties of the traffic law enforcement stochastic process. More specifically, descriptive statistics principles can be utilized to quantitatively describe the historical characteristics of traffic law enforcement from the event records which may include determining the mean, variance, frequency, histogram, distributions, accumulations, minimum and maximum of properties derived from historical citation records including those of Equation 1. Further, statistical inference can be utilized to infer and predict the properties presented in Table 1, of traffic law enforcement, from historical encounters with and citation records of traffic law enforcement, which may include patrol locations, schedules, and enforcement profiles. Correlation is also a statistical measure which refers to a broad class of statistical relationships involving dependence between random variables. The following sections present preferred algorithms for utilizing correlation and statistical analysis to estimate patrol locations, schedules, and enforcement profiles of traffic law enforcement and may include the properties presented in Table 1.

Patrol Location Estimation—Operation 204

The patrol location estimator 204 preferably determines the locations where it is likely to encounter traffic law enforcement patrols. Table 1 provides a listing of estimated traffic law enforcement properties which may be provided by the current invention, and the estimation of Patrol Location and the Patrol Location Intensity properties of Table 1 may be determined by the Patrol Location Estimator operation 204. In a preferred embodiment, the patrol location estimator 204, may implement algorithms utilizing historic and or real time records similar to Equation 1, derived from traffic law enforcement citations and crowd sourced data 222 to predict patrol locations 215. In yet another preferred embodiment, the patrol location estimator 204 may utilize records similar to Equation 1a, of previously determined predicted patrol locations and location patrol intensity of traffic law enforcement patrols 222, to predict patrol locations and location patrol intensities 215.

A preferred method of the patrol location estimator 204 to determine patrol location estimates 215, calculates the correlation between a plurality of records 222 and identifies traffic law enforcement patrol locations. In a preferred embodiment of patrol location estimation operation 204, Equation 4a, 4a1 could be utilized to compute the location correlation between citation record 222 locations from Equation 1, possibly as a function of citation type, time, and direction. Relative maximum in the correlation result may be identified by the location estimation operation 204 as periodic patrol patterns at a location and can be time extrapolated into the present or future and hence predict patrol locations 215. In a preferred embodiment, the patrol location estimator 204 correlates a plurality of random citation events $C_1, C_2, C_N$ to optimize the accuracy of patrol location estimates 215; however, preferably said plurality of events to be correlated could include any combination of the following enumerated records 222 of Equation 1:

1) Citations issued at a location
2) Citations issued at a location and in a direction
3) Citations issued as a function of time at a location
4) Citations issued as a function of time at a location and in a direction
5) Traffic flow volume as a function of time at a location
6) Traffic flow rate as a function of time at a location In another preferred embodiment, the patrol location estimator 204 can compute the auto correlation of the time sequence of citation records 222 at a plurality of locations limited to be within the region of interest 223 wherein the relative maxima of said auto correlation indicates the presence of periodic patrol patterns at said plurality of locations. Operation 204 can observe the relative maxima of said autocorrelation and determine locations where patrols occur and the periodic times at which said patrols occur and time extrapolate the periodic times of the patrols to predict locations of patrols at the present and or future times and provide said predicted patrol locations and times as indication 215. Equation 4b provides a preferred method of operation 204 for computation of the auto correlation of issued citations locations as a function of citation type and time.

$$\text{coorelation}(type, loc, \tau) = \int_{t=t1}^{t=t2} dbe(type, loc, t) dbe(type, loc, \tau - t)$$

Equation 4b. A preferred correlation method to estimate patrol locations

In equation 4b, the correlation can be computed for a citation type and or location and patrol interval time $T$, between a starting time $t_1$ and an ending time $t_2$. In a preferred embodiment, operation 204 can compute the correlation of equation 4b and identify relative maximums as a function of patrol interval time $T$ which indicate traffic law enforcement patrol locations and patrol intervals and provide said predicted patrol locations and times as indication 215.

In another preferred embodiment, the patrol location estimator 204 can compute the accumulation of citation records 222 at a plurality of locations between a time interval $t_1$ and $t_2$ and determine historic patrol locations as locations with accumulation results above a threshold and or accumulation results which are relatively higher than other locations. Operation 204 can predict current and future patrol locations from historic patrol locations and provide said predicted patrol locations as indication 215.

In a preferred embodiment, the patrol location estimator 204 computes the accumulation 215 of historical and or real time traffic law enforcement encounters preferably as a function of time, location, and by type of citation or encounter type. The accumulation 215 at each location may be interpreted relative to other locations to determine patrol location estimates preferably as the locations with higher relative accumulations. Alternatively or additionally, the patrol location estimation operation 204 could preferably compare the accumulation 215 at each location to a threshold to determine patrol location estimates preferably as the locations with accumulations greater than the threshold. A preferred accumulation algorithm is shown in Equation 4; however, other algorithms to compute the citation location accumulation are possible and should be considered within the scope of the present invention. Equation 4 accumulation is algorithmically equivalent to the auto correlation with time shift of zero and computed at a plurality of locations.

$$\text{accumulation}(type, loc, t) = \sum_{t=t1}^{t=t2} dbe(type, loc, t)$$

Equation 4. A preferred computation of encounter location accumulation.

The following terms of equation 4 are defined:

Accumulation(loc)—total occurrences of encounters at a given location loc, time t, and of type Loc—location, and may preferably include direction dbe(type, loc, t)—data base entry at time t and location loc and of type.

t—time t1—start time and date of interval for calculating the total number of encounters t2—end time and date of interval for calculating the total number of encounters Equation 4 preferably computes the total number of occurrences of citations and or encounters issued at a given location loc within a specified time period t1 to t2 referred to as citation accumulation and of a type of citation. Operation 204 preferably computes the citation location accumulation for each location 223 to produce a complete histogram of citation accumulations at each location loc and for each citation type. Preferably the time period t1 to t2 is large enough to give an accurate representation of issued citations at a given loc, said period t1 to t2 being preferably in the range of 1 minute to several years.

In another preferred embodiment, the patrol location estimator 204 may compute the patrol location estimates utilizing traffic flow database entries 16 and or 23 to compute the ratio of accumulated traffic encounters as a function of time, location and type to traffic volume as a function of time and location to normalize said accumulated traffic law enforcement encounters and preferably enable more accurate prediction of estimated patrol locations. Equation 4c demonstrates an example algorithm for computing the citation accumulation normalized by traffic volume.

$$\text{normalized\_accumulation}(\text{type}, loc, t) = \left(\sum_{t=t1}^{t=t2} dbe(\text{type}, loc, t)\right) / \text{traffic\_flow}(loc, t)$$

Equation 4c. A preferred computation of normalized encounter location accumulation.

The following terms of equation 4 are defined:

Normalized Accumulation(type, loc, t)—total occurrences of encounters at a given location loc, time range t2 to t1, and of type Traffic_flow(loc,t)—traffic volume at location loc and time interval t2 to t1.

Loc—location and may preferably include direction dbe (type, loc,t)—data base entry at time t and location loc of type t—time t1—start time and date of interval for calculating the total number of citations t2—end time and date of interval for calculating the total number of citations In yet another preferred embodiment, the patrol location estimator 204 may utilize records similar to Equation 1 a, of previously determined predicted locations of traffic law enforcement patrols 222, to predict patrol locations 215.

The predicted patrol locations produced by the patrol location estimator 204 are provided on indication 215.

Patrol Schedule Estimator Operation 205

In a preferred embodiment, the patrol schedule estimator 205 predicts the schedules of traffic law enforcement patrols at a plurality of locations within the region of interest 223. Table 1 provides a listing of estimated traffic law enforcement properties which may be provided by the current invention, and the Estimated Patrol Schedule property of Table 1 may be determined by the Patrol Schedule Estimator operation 205. The patrol schedule estimator 205 could implement algorithms utilizing historic and real time records derived from traffic law enforcement citations and crowd sourced data 222 to predict patrol schedules. In another preferred embodiment, the patrol schedule estimator 205 could compute the time-location correlation Equation 4a, 4a1 of records similar to Equation 1, which are derived from historic traffic law enforcement citations and crowd sourced data 222, to estimate traffic law enforcement patrol schedules 213, preferably as a function of location and by type of citation or encounter type. In yet another preferred embodiment, the patrol schedule estimator 205 may utilize records similar to Equation 1 a, of previously predicted schedules of traffic law enforcement patrols 222, to predict traffic law enforcement patrol schedules 213, at a plurality locations within the region of interest 223.

In a preferred embodiment, the patrol schedule estimator 205 preferably computes the time-location correlation of encounters 213 retrieved from database 2, 4, 5, 30 and preferably uses the time-location correlation of historical encounters to predict patrol schedules at a plurality of locations within the region of interest 223. The patrol schedule estimator 205 could implement the correlation method of Equation 4a, 4a1 and the autocorrelation method of Equation 4b to estimate patrol schedules. In equation 4b, the correlation can be computed as a function of citation type and or location and patrol interval time T, between a starting time $t_1$ and an ending time t2. In a preferred embodiment, the patrol schedule estimator operation 205 can compute the correlation of equation 4a1 or 4b and identify relative maximums as a function of patrol interval time T which indicates traffic law enforcement patrol locations and patrol intervals. From said patrol intervals T, the patrol schedule estimator operation 205 can infer the historic schedules of traffic law enforcement and time extrapolate said historic schedules to predict current and future schedules of traffic law enforcement and provide said predicted patrol locations and associated patrol schedules as indication 213.

Figure 3:
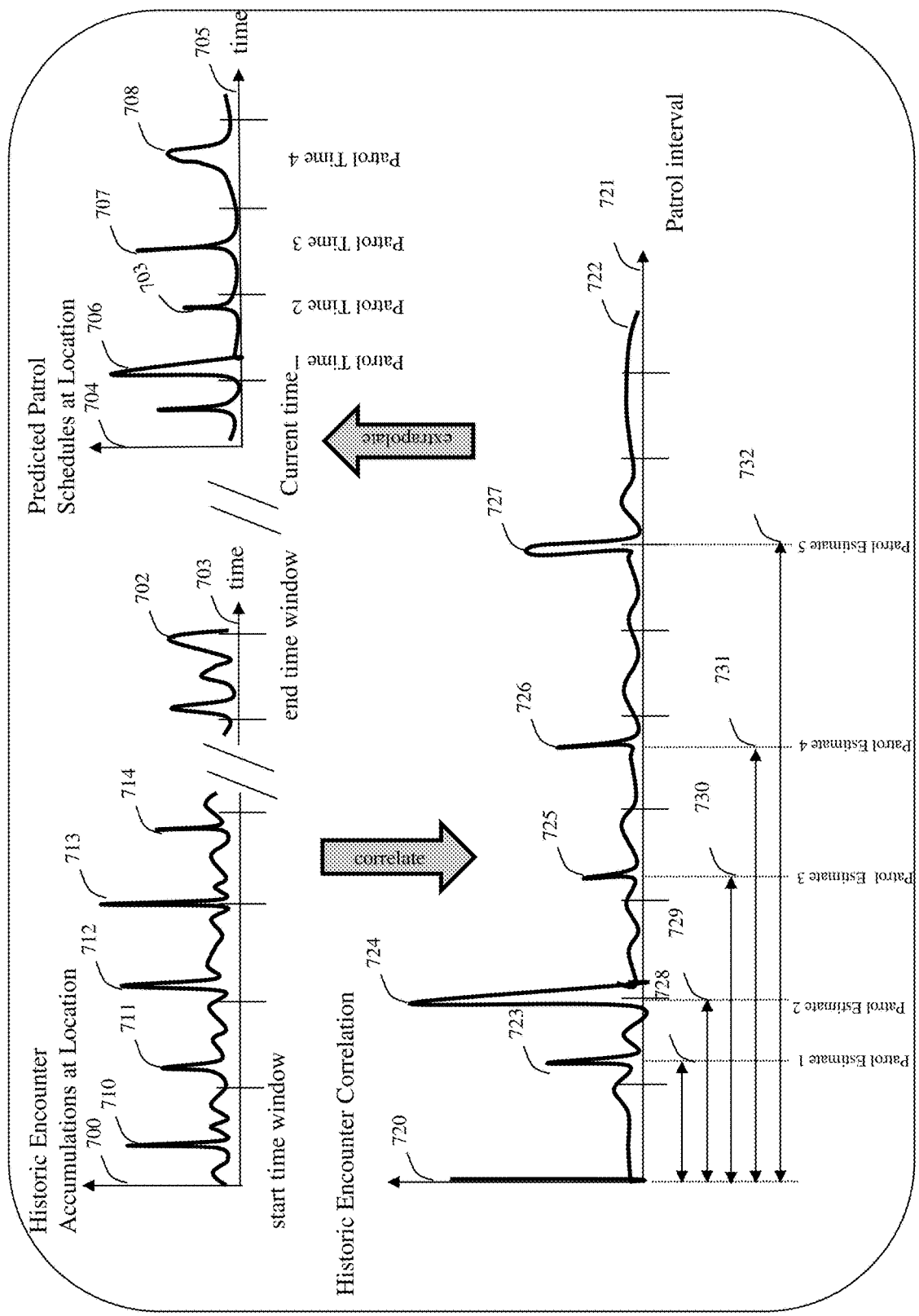

FIG. 3 graphically demonstrates a preferred correlation method of patrol schedule estimator 205 for estimating traffic law enforcement patrol schedules and locations. FIG. 3 shows a representative plot of the accumulation of traffic law enforcement encounters 700 at a location as a function of time and demonstrates a preferred method of correlation to derive patrol schedule estimates 720 and time extrapolation to infer and predict patrol schedules at present and future times 704. Time instances where there is an increase in law enforcement encounters are shown as encounter accumulation maximums 710, 711, 712, 713, 714 and indicate possible times where there may be increased patrols. Graph 720 may present the result of correlating the encounter accumulation 700 as a function of time which yields the encounter correlation result 720 with maxima 723, 724, 725, 726, 727 indicating the presence of periodic patrol patterns in historic encounter accumulations and provides an estimated patrol schedule. The amplitude of correlation 720 provides an indication of reliability of the predicted patrol schedule at said location and time, while the width of the correlation maxima 723,724,725, 726, 727 provides an indication of the time variance and duration of patrol interval. From the correlation maxima 723,724, 725, 726, 727 predicted patrol schedules are provided and can be time extrapolated to create estimated current and future patrol schedules 704 at said location. The maxima 706, 703, 707, 708 of the predicted patrol schedules 704 provide specific statistically probable patrol times and the amplitude of the maxima 706, 703, 707, 708 provide a relative indication of the likelihood of patrol and the width of said maxima provides an indication of the typical duration of the patrols or time uncertainty of the patrols at said location.

In a preferred embodiment, correlation of historic traffic law enforcement records could be performed over a period of minutes, hours, days, weeks or even years to provide estimates of traffic law enforcement patrol schedules. However, correlation of historic traffic law enforcement records over time intervals of 10 years or less is generally sufficient to produce reliable estimates of patrol schedules 213. The correlation results from historical law enforcement encounters can be time extrapolated to infer real time and future patrol schedules 213.

Conceptually various algorithms and equations can be employed by the patrol schedule estimator 205 to estimate patrol schedules from traffic law enforcement citation records and crowd encounter 222 and should be considered within the scope of the present invention. Additional preferred algorithms for estimating patrol schedules by computing the time-location correlation are shown in equation 5 and equation 5a. Equation 5a presents a preferred method of the patrol schedule estimator operation 205 for correlating records and encounters 222 as a function of location, patrol intervals and over a time period interest. Equation 5a may compute the encounter_correlation Equation 5a by auto correlating the database records 222 at a location and for a patrol time interval. The relative maximums of the encounter_correlation Equation 5a, correspond to periodic patrol patterns or schedules of traffic law enforcement of interval t_patrol at the associated location loc. In a preferred embodiment, the patrol schedule estimator operation 205 can observe said relative maximums of the encounter_correlation Equation 5a, and determines the periodic traffic law enforcement patrol intervals. The patrol schedule estimator 205 may time extrapolate said patrol intervals to predict the current and or future enforcement schedules at the associated locations and provides said predicted patrol locations and associated schedules as indication 213.

$$\text{encounter\_correlation}(loc \pm \Delta\alpha, \text{t\_patrol}) = $$
$$\int_{t=start}^{t=end} dbe(loc \pm \Delta\alpha, t \pm \Delta\varepsilon) dbe(loc \pm \Delta\alpha, t \pm \Delta\varepsilon - \text{t\_patrol})$$

Equation 5a. A preferred algorithm for computation of encounter time-location correlation.

The following preferable terms of equation 5a are defined:
correlation(loc, t_patrol)—the correlation of encounters at location loc and patrol interval t_patrol Loc+/−Δα—location of said violation within +/−Δαdistance, Δα preferably ranges from 100 feet to 50 miles. Loc preferably also includes direction.

dbe(loc+/−Δα, t+/−Δε+/−t_patrol)—represents a database entry which has a matching location loc and issue time Δt+/−Δε.

tstart—the earliest time for calculating correlation time duration.

tend—the last time for calculating correlation time duration.

t+/−Δε—time of said violation within +/−Δε time, Δε preferably ranges from 1 minute to 1 day.

Equation 5, is yet another preferred algorithm for estimating patrol schedules by correlating the database entries as a function of time and location.

$$\text{encounter\_correlation}(loc + \Delta\alpha, \Delta t) = $$
$$\sum_{n=n\,min}^{n\,max} dbe(loc + \Delta\alpha, n\Delta t + \Delta\varepsilon)$$

Equation 5. Preferred algorithm for computation of encounter location-time correlation.

The following preferable terms of equation 5 are defined:
correlation(loc, Δt)—the total correlation of citation locations at periodic times Δt Loc+Δα—location of said violation within +/−Δαdistance, Δα preferably ranges from 100 feet to 50 miles. Loc preferably also includes direction.

dbe(loc, nΔt+Δε)—represents a database entry which has a matching location loc and issue time nΔt+Δε.

Nmin—the earliest index for calculating correlation time duration.

Nmax—the last index for calculating correlation time duration.

nt+Δε—time of said violation within +/−Δε time, Δε preferably ranges from 1 minute to 1 day.

Equation 5 preferably computes the total number of periodic occurrences of citations issued at a given location loc at the periodic times starting at time nmin*Δt+Δε.to nmax*Δt+Δε. This could be accomplished by accessing the database records 222 dbe and summing the number of entries with matching loc and time n*Δt+Δε. The occurrence of each matching dbe preferably has a weight of one. Said periodic times n*Δt+Δε could have a Δε term added which functions to allow a dbe with matching loc and in the span of +/−c to match. Δε preferably has a span of 1 minute to 24 hours such that any dbe with a matching location loc, and issue time not within the said span Δε would preferably produce a positive match result. The patrol schedule estimator 205 preferably repeats computation of Equation 5 for each location 223 in the geographic region of interest. Furthermore, the patrol schedule estimator operation 205 preferably repeats computation of equation 5 for different time spacing intervals Δt preferably ranging from one hour to one year in an attempt to identify periodic correlations between issued citations times and locations. Said citation location-time correlation results 213 of the patrol schedule estimator 205 are preferably passed to the Indication operation 207 and or the vehicle control operation 226.

Figure 4:
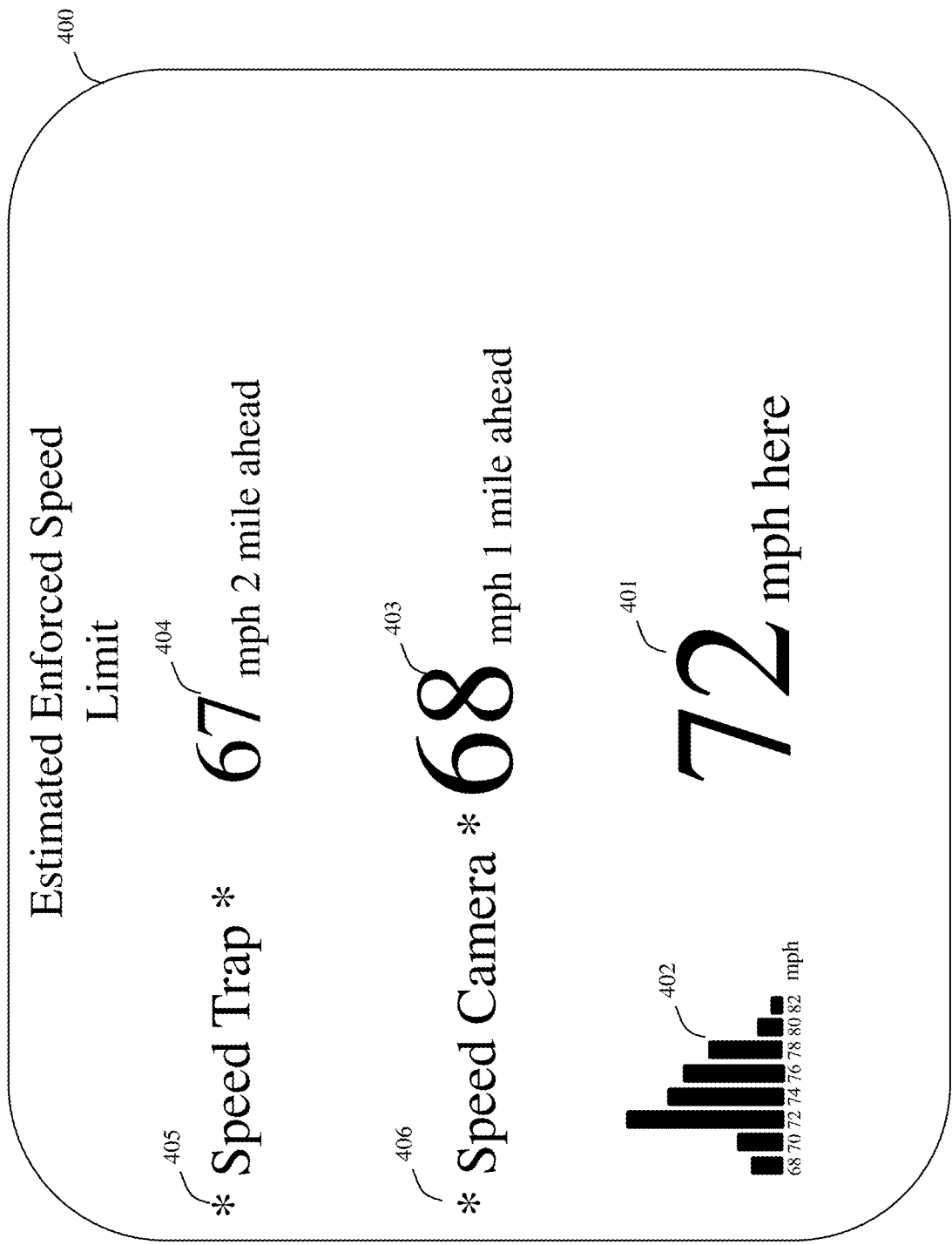

The algorithms presented in Equations 4a, 4a1, 4b, 5, 5a and FIG. 4 are examples of preferred methods to estimate and predict traffic law enforcement patrol schedules from historic traffic law enforcement and crowd sourced records; however, other algorithms to estimate traffic law enforcement patrol schedules are possible but should be considered within the scope of the present invention including using records of previously determined, estimated and predicted traffic law enforcement patrol schedules.

In yet another preferred embodiment, the patrol schedule estimator 205 may utilize records similar to Equation 1 a, of previously determined predicted locations of traffic law enforcement patrols 222, to predict patrol schedules 215.

Patrol Enforcement Profile Estimator Operation 206

The patrol enforcement profile estimator, operation 206, preferably determines the enforcement profile of traffic law enforcement. Table 1 provides a listing of estimated traffic law enforcement properties and patterns which may be provided by the current invention, and the estimation of Patrol Profile properties of Table 1 may be determined by the Patrol Enforcement Profiler operation 204. In a preferred embodiment, the patrol enforcement profile estimator 206, determines the traffic law enforcement profile 214 at a plurality of locations within the geographic region and time intervals of interest 223 utilizing database records derived from historic traffic law enforcement citation records and or crowd sourced encounters 222. In yet another preferred embodiment, the patrol profile estimator 206 utilizes records, similar to Equation 1a and Table 1, of previously predicted profiles of traffic law enforcement patrols 222, to predict traffic law enforcement patrol profiles 214, at a plurality of locations within the region of interest 223.

In a preferred embodiment, the traffic law enforcement profile estimator 206 may estimate traffic law enforcement profile properties 214 at a plurality of locations and times within the region and time frame of interest 223 which are summarized in Patrol Profile of Table 1 and may include any combination of: enforced speed limit, speed trap location, red light camera location, speed camera location, aircraft speed limit enforced location, histogram of issued citation types, location citation density, enforcement profile of traffic laws, histogram of citation speeds for speeding citations, number of issued citations, the distribution of enforced traffic laws, probability of receiving a traffic citation, probability of encountering traffic law enforcement, and the austerity with which traffic laws are enforced.

The austerity with which traffic laws are enforced may comprise those in Table 1 including enforcement leniency profile, speed limit enforcement austerity relative to average traffic flow velocity, location enforcement austerity relative to average traffic volume, speed limit enforcement austerity relative to average traffic volume and other austerity metrics and combinations thereof, and indicate said plurality of profile properties on 214. Those skilled in the art will recognize that additional traffic law enforcement profile characteristics can be derived from historic citation records and could be implemented with the programmable patrol profile estimator 206, and should be considered within the scope of the present invention.

In a preferred embodiment the patrol profile estimator 206, may utilize correlation methods analogous to Equation 4a, 4a1 and statistical analysis to estimate the historical patterns and properties provided in Table 1, of traffic law enforcement from historical records of citation and encounters 222. The patrol profile estimator 206 may correlate properties derived from citation records 222, analogous to Equation 1, which could include citation record: violation speed, time, date, location, travel direction, citation type, traffic volume, and average traffic velocity to estimate historical and predicted enforcement properties of traffic law enforcement 214, as presented in Table 1, at the current location 225 or surrounding locations within the region of interest 223 of apparatus 14.

In yet another preferred embodiment, the enforcement profiler 206 may access previously computed predicted traffic law enforcement profiles 222 analogous to Equation 1a or Table 1, at a plurality of locations within the region of interest 223, to provide predicted enforcement profile properties presented in Table 1. Alternatively or additionally, the enforcement profiler 222 may access historic records derived from issued citations and crowd sourced law enforcement encounters 222 analogous to Equation 1, at a plurality of locations with the region of interest 223, to compute the predicted enforcement profile properties of Table 1. The enforcement profiler 206 may provide combinations of the enforcement profile properties in Equation 1 a, and Table 1 and more specifically, the enforcement profiler 206, may provide any combinations of the following enforcement profiles properties:

Enforcement Profile Properties:

Enforced Speed Limit

In a preferred embodiment the enforcement profile estimator 206 may estimate the enforced speed limit at a plurality of locations and time periods within the region and time interval of interest 223 and provide an indication of the estimated enforced speed limit on 214. The enforced speed limit 214 is equal to or higher than the posted speed limit and is preferably the maximum speed at which there is not a statistically unacceptable chance of being cited for speeding by traffic law enforcement. The enforced speed limit at a location may vary with the time of day, direction of travel, traffic flow volume and time of month or year and other events. The patrol profile estimator 206, may utilize Equations 4a, 4a1 to correlate citation records 222 and determine the historical patterns and relationship of enforced speed limit to location, travel direction, time, date, traffic volume, and average traffic velocity. The patrol profile estimator 206 may also time extrapolate from the historical patterns of enforced speed limit to infer the enforced speed limit 214 at the location, time, date, and travel direction 225 of apparatus 14.

In a preferred embodiment, the patrol enforcement profiler 206, can compute a histogram of citation speeds from records 222 of issued traffic law enforcement citations at location 225 of apparatus 14 or a plurality of locations within the region of interest 223. Said histogram of citation speeds provides a representation of speed limit enforcement profile for interpretation by a user and or the histogram could be further processed by the enforcement profiler 206 to determine an estimate of the enforcement speed limit 214 possibly as the maximum positive slope of the histogram.

In another preferred embodiment, the enforcement profiler operation 206 may determine the estimated enforced speed limit 214 as the minimum speed for which a speeding citation was issued from records 222 of issued speeding citations at the corresponding location and preferably time. Furthermore, the enforcement profiler operation 206 may additionally or alternatively estimate the enforced speed limit 214 as the average of citation speeds of records 222 for which speeding citations were issued at the corresponding location and preferably time. In a preferred embodiment, the enforcement profiler operation 206 may also calculate the variance of the violation speeds of speeding citations records 222 at location 225 of apparatus 14 or a plurality of locations 223 which represents the variability and uncertainty in the estimated enforced speed limit traffic law enforcement profile.

In addition to the presented methods of estimating the enforced speed limit, the enforcement profiler 206 is preferably programmable and may implement additional methods of estimating said enforced speed limit from historical records of traffic law enforcement citations and crowd sourced encounters which should be considered within the scope of the current invention. The traffic law enforcement profiles computed by operation 206 are preferably presented on 214.

In a preferred embodiment, the enforcement profiler 206 may calculate the mean citation speed from records of law enforcement citations and crowd sourced data 222 is shown in equation 6. Equation 6 can be derived from the generalized correlation Equations 4a, 4a1 as a constrained correlation and represents an algorithm to determine the mean citation speed for which speeding citations were issued as a function of time and location.

$$\text{mean\_citation\_speed}(loc, t) = 1/N \sum_{matching} dbe.\text{speed}(loc + \Delta\alpha, t + \Delta\varepsilon)$$

Equation 6. A preferred constrained correlation method to determine the mean citation speed The following terms of Equation 6 are defined:

Dbe.speed—represents database entry citation speed for which the speeding citation was issued.

Loc+$\Delta\alpha$—location of said violation within +/−$\Delta\alpha$distance, $\Delta\alpha$ preferably ranges from 100 feet to 10 miles.

T+Δε—time of said violation within +/−Δε time, Δε preferably ranges from 1 minute to 1 day. 1/N—N is the total number of dbe entries which match at said location and time In a preferred embodiment, the enforcement profiler 206 may additionally or alternatively compute the citation speed variance as a function of location and time from traffic law enforcement records and or crowd sourced records 222 and an example algorithm is shown in equation 7. Said variance may indicate the uncertainty in the enforced speed limit or speed limit traffic law enforcement profile. Said citation variance results are indicated on 214 and are preferably provided to the Indication operation 207 and or the vehicle control operation 226.

$$\text{citation\_speed\_variance }(loc,t)=1/N\Sigma(\text{dbe.speed}(loc+\Delta\alpha, t+\Delta\varepsilon)-\text{mean\_citation\_speed }(loc,t))^{**}2$$

Equation 7. A preferred method to determine citation speed variance as a function of location and time.

Citation_speed_variance—variance of violation speed for which citations were issued at the specified location and time.

dbe.speed—database entry violation speed at the specified location and time.

Loc+Δα—location of said violation within +/−Δα distance, Δα preferably ranges from 100 feet to 10 miles.

T+Δε—time of said violation within +/−Δε time, Δε preferably ranges from 1 minute to 1 day. 1/N—N is the total number of dbe entries which match at said location and time In yet another preferred embodiment, the enforcement profiler 206 may determine the enforced speed limit as minimum citation speed preferably as a function of location and optionally time and or direction from the records of traffic law enforcement citations and crowd sourced encounters 222 and a preferred algorithm is shown in Equation 8. Said minimum citation speed provides an estimation of enforced speed limit by traffic law enforcement as a function of location and optionally time and or direction and an estimation of the maximum speed to avoid receiving a citation.

$$\text{min\_citation\_speed}(loc,t)=\text{floor}(\text{dbespeed}(loc+\Delta\alpha,t+\Delta\varepsilon))$$

Equation 8. A preferred method to determine minimum citation speed.

Min_citation_speed—minimum violation speed for which a citation has been issued at the specified location and time.

dbe.speed—database entry violation speed at the specified location and time.

Loc+Δα—location of said violation within +/−Δα distance, Δα preferably ranges from 100 feet to 10 miles.

T+Δε—time of said violation within +/−Δε time, Δε preferably ranges from 1 minute to 1 day.

In equation 8, the floor function accesses dbe entries 222 at the location 225 of apparatus 14 or within the region of interest 223 and extracts the lowest speed field from the set of dbe records. Said minimum citation speed results 214 of operation 206 are preferably provided on 214.

The algorithms presented in Equation 6, 7, and 8 are examples of preferred methods to estimate traffic law enforcement profile from historic traffic law enforcement and crowd sourced records; however, other algorithms to estimate traffic law enforcement profile from records of traffic law enforcement citations and crowd sourced encounters 222 are possible and should be considered within the scope of the present invention.

Those skilled in the art will recognize that additional enforced speed limit profiling characteristics can be derived from historic citation records and crowd sourced encounters of traffic law enforcement 222, and databases 2, 4, 5, 30, and could be implemented with the programmable patrol profile estimator 206, and should be considered within the scope of the present invention. Additionally, those skilled in the art will recognize that the enforced speed limit estimate could be pre computed for locations 225, 223 and stored in the databases 2,4,5,30 and provided as records 222 which could then be provided by the patrol profile estimator 206 as indication 214.

Histogram of Citation Speeds:

In a preferred embodiment, the enforcement profiler 206 may determine a histogram of violation speeds for which citations 222 were issued at location 225 of apparatus 14 and at a plurality of locations within the time intervals and region of interest 223 and the citation violation speed histograms may be indicated on 214. The histogram may provide a statistical representation of the distribution of speeding citation violation speeds. The enforcement profiler 206, preferably determines the histogram of speeds at a location for which speeding citations were issued by indicating the distribution of the accumulation of each citation violation speed derived from records of issued speeding citations 222 at the corresponding citation location. The histogram of citation violation speeds may provide an enforcement profile of the enforced speed limit at the associated location. Furthermore, the enforcement profiler 206 may determine the speed at which the histogram of violation speeds achieves maximum positive slope to estimate the enforced speed limit 214. Additionally, those skilled in the art will recognize that histogram of citation speeds could be pre computed for locations 225, 223 and stored in the databases 2,4,5,30 and provided as records 222 which could then be provided by the patrol profile estimator 206 as indication 214.

Histogram of Enforced Traffic Laws:

In a preferred embodiment, the enforcement profiler 206 may determine a histogram of enforced traffic laws for which citations were issued at the location of apparatus 225 and a plurality of locations within the time intervals and region of interest 223 and the histogram of enforced traffic laws may be indicated on 214. The histogram of enforced traffic laws 214, may provide a statistical estimation of traffic laws which are enforce at a location. The enforcement profiler 206, preferably determines the histogram of enforced traffic laws at a location by indicating the distribution of the issued citation types from records of issued speeding citations 222 at the corresponding citation location. Citation types could consist of both moving and non-moving citation violation types such as speeding, expired registration, invalid display of license plate for example. The histogram of enforced traffic laws may provide an enforcement profile of traffic laws. Additionally, those skilled in the art will recognize that the histogram of enforced traffic laws could be pre computed for locations 225, 223 and stored in the databases 2,4,5,30 and provided as records 222 which could then be provided by the patrol profile estimator 206 as indication 214.

Enforcement Profile of Traffic Laws:

In a preferred embodiment, the enforcement profiler 206 may estimate the enforcement profile of traffic laws which preferably consists of estimating combinations of the enforcement schedule and enforcement austerity for different types of traffic citations and provide an indication on 214. The enforcement profiler 206 may determine the enforcement profile of traffic laws at the location 225 of apparatus 14 or at a plurality of locations within the region and timeframe of interest 223 by computing the correlation between properties of historically issued citations 222 which may include combinations of issue time, date, location, citation warning, and citation type. In a preferred embodiment, the enforcement profiler 206 may utilize the method of Equation 4a, 4a1 to compute the correlation between citation properties to determine the enforcement profile of traffic laws. Additionally, those skilled in the art will recognize that the enforcement profile of traffic laws could be pre computed for locations 225, 223 and stored in the databases 2,4,5,30 and provided as records 222 which could then be provided by the patrol profile estimator 206 as indication 214.

Location Citation Density

The location citation density may be determined as the frequency of issued citations which are correlated to a geographic location and may provide a statistical indication of the extent to which a location is patrolled. In a preferred embodiment, the enforcement profiler 206 may determine the density of issued citations 222 at locations within the time intervals and region of interest 223 and provide an indication of the location citation density on 214. The enforcement profiler 206, preferably determines the citation density by accumulating the citations issued at each location at the current location 225 or at locations within the region of interest 223 which are derived from records of issued citations 222 and may be normalized by traffic volume and may provide an indication of location patrol intensity. The location citation density could be determined as a function of citation type and time may provide a geographical enforcement profile. Additionally, those skilled in the art will recognize that location citation density could be pre computed for locations 225, 223 and stored in the databases 2,4,5,30 and provided as records 222 which could then be provided by the patrol profile estimator 206 as indication 214.

Speed Trap Enforcement Location:

In a preferred embodiment, the enforcement profiler 206 may utilize combinations of records of historic issued citations and crowd sourced encounters 222 to predict the locations of speed traps within the region and time intervals of interest 223 and provide an indication on 214.

In a preferred embodiment, the enforcement profiler 206 may determine the location of estimated speed traps as locations with any statistical combination of: a region with a statistical increase in location correlation of issued citations relative to surrounding regions, an increase in location citation density relative to surrounding areas, drop in estimated enforced speed limit, an increase in probability of a vehicle having an encounter with traffic law enforcement, or an increase in relative ratios of issued traffic citations to traffic volume that exceed a programmable threshold relative to the ratios of issued traffic citations to traffic volume in surrounding locations. Furthermore, in a preferred embodiment, the enforcement profiler 206, in addition to predicting the location of speed traps, may also predict the schedules of speed trap enforcement by utilizing the patrol schedule estimates 213 from the patrol schedule estimation 205. Additionally, or alternatively the schedule of speed trap enforcement at speed trap locations can be predicted by determining said ratios of issued traffic citations 222 to traffic volume at historic times and locations and then correlating said ratios as a function of time to identify patrol schedules which are time correlated, and then time extrapolating said correlation to predict said speed trap enforcement schedules.

Those skilled in the art will recognize that additional speed trap detection profiling characteristics can be derived from historic citation records and could be implemented with the programmable patrol profile estimator 206, and should be considered within the scope of the present invention. Additionally, those skilled in the art will recognize that locations of speed traps could be pre computed for locations 225, 223 and stored in the databases 2,4,5,30 and provided as records 222 which could then be provided by the patrol profile estimator 206 as indication 214.

Aircraft Speed Enforcement Location:

In a preferred embodiment, the enforcement profiler 206 may utilize combinations of records of historic issued citations and crowd sourced encounters 222 to predict the locations of aircraft speed limit enforcement within the region and time intervals of interest 223 and provide an indication on 214.

In a preferred embodiment, the enforcement profiler 206 may determine the location of estimated aircraft speed limit enforcement locations with any combination of: a region with a statistical increase in location correlation of issued citations relative to surrounding regions, relative to surrounding areas an increase in location citation density, drop in estimated enforced speed limit, an increase in probability of a vehicle having an encounter with traffic law enforcement, or an increase in relative ratios of issued traffic citations to traffic volume that exceed a programmable threshold relative to the ratios of issued traffic citations to traffic volume in surrounding locations. Additionally, or alternatively, the enforcement profiler 206 may determine locations where the speed limit is enforced by aircraft by examining the citation type of citation records presented in Equation 1 as being issued by aircraft enforcement and utilizing the citation location correlation as the location of the aircraft speed limit enforced location.

Furthermore, in a preferred embodiment, the enforcement profiler 206, in addition to predicting the location aircraft speed limit enforcement, may also predict the schedules of aircraft speed limit enforcement by utilizing the patrol schedule estimates 213 from the patrol schedule estimation 205. Additionally, or alternatively the schedule of aircraft speed limit enforcement at patrolled locations can be predicted by determining said ratios of issued traffic citations 222 to traffic volume at historic times and locations and then correlating, analogous to Equation 4a, 4a1, said ratios as a function of time to identify patrol schedules which are time correlated, and then time extrapolating said correlation to predict said aircraft speed limit enforcement schedules.

Those skilled in the art will recognize that additional aircraft speed limit enforcement detection profiling characteristics can be derived from historic citation records and could be implemented with the programmable patrol profile estimator 206, and should be considered within the scope of the present invention. Additionally, those skilled in the art will recognize that locations of aircraft speed limit enforcement could be pre computed for locations 225, 223 and stored in the databases 2,4,5,30 and provided as records 222 which could then be provided by the patrol profile estimator 206 as indication 214.

Red Light Camera Enforced Intersection:

In a preferred embodiment, the enforcement profiler 206 may utilize combinations of records of historic issued citations and crowd sourced encounters 222 to predict the locations of intersections with red light camera enforcement within the region and timeframe of interest 223 and provide an indication on 214. The enforcement profiler 206 may determine locations of intersections equipped with red light camera enforcement by examining the citation type of citation records presented in Equation 1 as being issued by automated red light camera enforcement and utilizing the citation location correlation as the location of the red light enforced intersection. Alternatively or additionally, the enforcement profiler 206 may determine locations of intersections equipped with red light camera enforcement by observing the relative density of citations issued 222 at intersections located within the region and time frame of interest 223, and infer the locations of intersections equipped with red light camera enforcement as those with a number of citations issued of type similar to red light violation exceeding a programmable threshold greater than the number of issued citations of similar type at surrounding intersections. Additionally, red light camera enforced areas may be indicated by a region with a statistical increase in location correlation of issued red light violation citations relative to surrounding regions.

Those skilled in the art will recognize that additional red light camera enforced detection profiling characteristics can be derived from historic citation records and could be implemented with the programmable patrol profile estimator 206, and should be considered within the scope of the present invention. Additionally, those skilled in the art will recognize that red light camera locations could be pre computed for locations 225, 223 and stored in the databases 2,4,5,30 and provided as records 222 which could then be provided by the patrol profile estimator 206 as indication 214.

Speed Camera Enforced Location:

In a preferred embodiment, the enforcement profiler 206 may utilize combinations of records of historic issued citations and crowd sourced encounters 222 to predict the locations with speed camera enforcement within the region and time period of interest 223 and provide an indication on 214. The enforcement profiler 206 may determine locations of roadway equipped with speed camera enforcement by examining citation type of citation records presented in Equation 1 as being issued by automated speed camera enforcement and utilizing the citation location correlation as the location of the speed camera enforcement. Alternatively or additionally, the enforcement profiler 206 may determine locations of roadway equipped with speed camera enforcement by observing the relative location citation density of issued 222 on roadway located within the region and time frame of interest 223, and infer the locations of roadway equipped with speed camera enforcement as those with a number of citations issued of type similar to speeding violation exceeding a programmable threshold greater than the number of issued citations of similar type at surrounding roadway.

Those skilled in the art will recognize that additional speed camera enforced detection profiling characteristics can be derived from historic citation records and could be implemented with the programmable patrol profile estimator 206, and should be considered within the scope of the present invention. Additionally, those skilled in the art will recognize that speed camera locations could be pre computed for locations 225, 223 and stored in the databases 2,4,5,30 and provided as records 222 which could then be provided by the patrol profile estimator 206 as indication 214.

Enforcement Austerity

The enforcement austerity estimate provides a means to predict the amount of flexibility, leniency or austereness of traffic law enforcement in enforcing traffic laws and may include the Enforcement Leniency Profile, Speed Limit Enforcement Austerity and Location Enforcement Austerity.

Enforcement Leniency Profile

In a preferred embodiment, the enforcement profiler 206, may determine the enforcement leniency profile which is a statistical measure of the willingness of traffic law enforcement to issue warnings rather than citations, at the location of apparatus 225 or locations within the region and time intervals of interest 223 and provide an indication on 214. The enforcement profiler 206, preferably determines the enforcement leniency profile for citation types and is derived from the ratio of the number of citations issued 222 of a given type to the number of warnings issued 222 of said given type at each location and time interval. The enforcement leniency profile of issued citations may provide a geographical representation of enforcement tolerance for each type of citation.

Those skilled in the art will recognize that additional enforcement leniency profiling characteristics can be derived from historic citation records and could be implemented with the programmable patrol profile estimator 206, and should be considered within the scope of the present invention. Additionally, those skilled in the art will recognize the enforcement leniency profile could be pre computed for locations 225, 223 and stored in the databases 2,4,5,30 and provided as records 222 which could then be provided by the patrol profile estimator 206 as indication 214.

Speed Limit Enforcement Austerity Relative to Average Traffic Flow Velocity

In a preferred embodiment, the enforcement profiler 206, may estimate the enforced speed limit austerity relative to the average flow velocity of traffic at the location of apparatus 225 or at a plurality of locations within the region of interest 223 and provide an indication on 214. The enforcement profiler may determine the speed limit enforcement austerity by correlating or comparing the average traffic flow velocity from historical records of traffic flow 222, contained in databases 16, 23 to traffic law enforcement issued citation speeds 222 at associated locations and times providing the enforced speed limit relative to the flow of traffic. Preferably the enforcement profiler 206 can compare the traffic flow rate with records of issued speeding citation velocities 222 and determine the estimated velocity at which traffic law enforcement issues citations at given times and locations relative to the average traffic flow velocity and may determine the austerity with which traffic law enforcement enforces the speed limit relative to average traffic flow velocities and volumes at given locations and times.

In another preferred embodiment, the enforcement profiler 206, may estimate the schedule of speed limit austerity relative to traffic flow velocities at the location 225 of apparatus 14 or at a plurality of locations within the region of interest 223 and provide an indication on 214. The enforcement profiler 206, preferably determines the difference between the historic traffic flow average velocity from databases 16, 23 at location 225 or plurality of said locations within 223 and the velocities at which historic citations have been issued at corresponding plurality of locations and times 222. At each location, the enforcement profiler may then cross correlate said differences as a function of time as in Equation 4a, 4a1 to estimate the enforced speed limit austerity schedule, and time extrapolate to predict current or future enforced speed limit austerity schedules at corresponding locations.

Those skilled in the art will recognize that additional speed limit enforcement austerity characteristics can be derived from historic citation records and could be implemented with the programmable patrol profile estimator 206, and should be considered within the scope of the present invention. Additionally, those skilled in the art will recognize the speed limit enforcement austerity could be pre computed for locations 225, 223 and stored in the databases 2,4,5,30 and provided as records 222 which could then be provided by the patrol profile estimator 206 as indication 214.

Location Enforcement Austerity Relative to Average Traffic Volume

In a preferred embodiment, the enforcement profiler 206, may estimate the probability of receiving a citation relative to the average flow volume of traffic at location 225 or a plurality of locations within the timeframe and region of interest 223, which provides a measure of how much a location is patrolled and may be indicated on 214. The enforcement profiler may determine the location enforcement austerity relative to the average traffic volume by computing the probability of a vehicle receiving a citation at a location derived from the ratio of the number of citations issued at a location and time interval to the average flow volume of traffic at the corresponding location and time interval.

Those skilled in the art will recognize that additional location enforcement austerity profiling characteristics can be derived from historic citation records and could be implemented with the programmable patrol profile estimator 206, and should be considered within the scope of the present invention. Additionally, those skilled in the art will recognize the location enforcement austerity profile could be pre computed for locations 225, 223 and stored in the databases 2,4,5,30 and provided as records 222 which could then be provided by the patrol profile estimator 206 as indication 214.

Speed Limit Enforcement Austerity Relative to Average Traffic Volume

In a preferred embodiment, the enforcement profiler 206, may estimate the enforced speed limit austerity relative to the average flow volume of traffic at the location of apparatus 225 or at a plurality of locations within the region of interest 223 and provide an indication on 214. The enforcement profiler may determine the speed limit enforcement austerity by comparing the average traffic flow volume from historical records of traffic flow 222, contained in databases 16, 23 to traffic law enforcement issued citation speeds 222 at associated locations and times providing the enforced speed limit relative to the flow of traffic. Preferably the enforcement profiler 206 can compare the traffic flow rate with records of issued speeding citation velocities 222 and determine the estimated velocity at which traffic law enforcement issues citations at given times and locations relative to the average traffic flow velocity and may determine the austerity with which traffic law enforcement enforces the speed limit correlated to the average traffic flow velocities and volumes at given locations and times.

Those skilled in the art will recognize that additional speed limit enforcement austerity profiling characteristics can be derived from historic citation records and could be implemented with the programmable patrol profile estimator 206, and should be considered within the scope of the present invention. Additionally, those skilled in the art will recognize the speed limit enforcement austerity profile could be pre computed for locations 225, 223 and stored in the databases 2,4,5,30 and provided as records 222 which could then be provided by the patrol profile estimator 206 as indication 214.

Those skilled in the art will recognize that in addition to the enforcement profiles outlined in the present invention, additional enforced profiles could be derived from historic records of citations and crowd sourced encounters and could be implemented with the programmable patrol profile estimator 206, and should be considered within the scope of the present invention.

Presentation of Enforcement Schedules, Locations, Profiles

Indication operation 207 provides a means to present the records of historical traffic law enforcement citations and crowd sourced events 222 and or estimated traffic law enforcement locations 215, schedules 213 and profile 214 to a user. In a preferred embodiment, indication operation 207 preferably accepts estimated patrol locations 215, estimated patrol schedules 213, the estimated traffic law enforcement profile 214, historic records of traffic law enforcement citations 222, and roadway map database entries 222 and apparatus speed, time, location and direction data 225 to present a representation which may include combinations of estimated traffic law enforcement locations 215, schedules 213, enforcement profile 214, historic traffic law enforcement records 222 and the traffic law enforcement properties presented in Table 1. Said presentation of estimated traffic law enforcement locations, schedules, enforcement profile and historic data may include audio 8 and or visual means 9.

Preferred Presentations

In a preferred embodiment, FIG. 4 presents a view 400 of display 9 preferably produced by the indication operation 207. Many variations of view 400 are possible, yet still provide combinations of historic and estimated traffic law enforcement characteristics which may include historic traffic law enforcement records 222, estimated traffic law enforcement locations 215, estimated schedules 213, and enforcement profile 214 and combinations thereof, and should be considered within the scope of the present invention. View 400 preferably presents a numerical representation of the estimated enforced speed limit 401 at the current location 225 of apparatus 14 and could optionally also present the estimated enforced speed limit at a plurality of points, preferably limited to less than 1000, further ahead or behind the direction of travel or in the vicinity of the apparatus 225. Items 403 and 404 indicate representative examples of the estimated enforced speed limit at a point 1 mile ahead and at a point 2 miles ahead respectively. In other preferred embodiments, fewer or additional estimated speed limits at other locations could be displayed over what is presented in the preferred view 400. Additionally or alternatively, a histogram or a distribution 402 could be presented at a plurality of locations, preferably less than 1000, which communicates the distribution of speeds at which citations 222 have been issued at said plurality of locations for the time period of interest 223. A histogram 402 provides a convenient means for a user to rapidly determine the enforcement profile and infer the enforced speed limit at locations of interest 223. Additionally or alternatively, view 400 may have indications for the locations of a plurality, preferably less than 1000, of estimated speed traps 405, or speed cameras 406 which were indicted on 215, 213 and 214. In a preferred embodiment, audio output 8 may enable audio indications of a plurality of estimated speed limits 401, 403, 404, and speed traps 405 in addition to or in place of displayed indications 401, 403, 404, 405 in which case display 9 may not be present.

Figure 5:
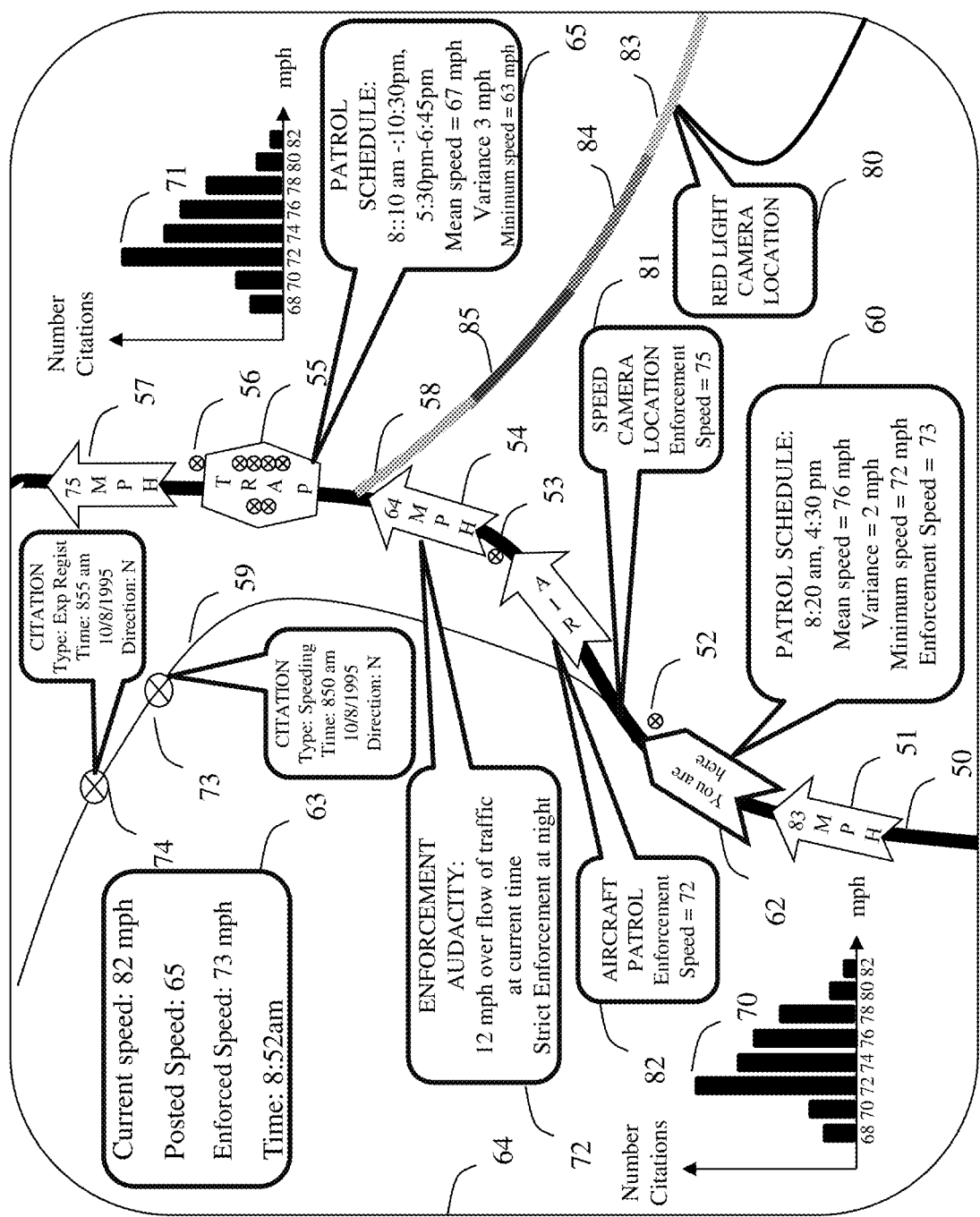
Figure 6:
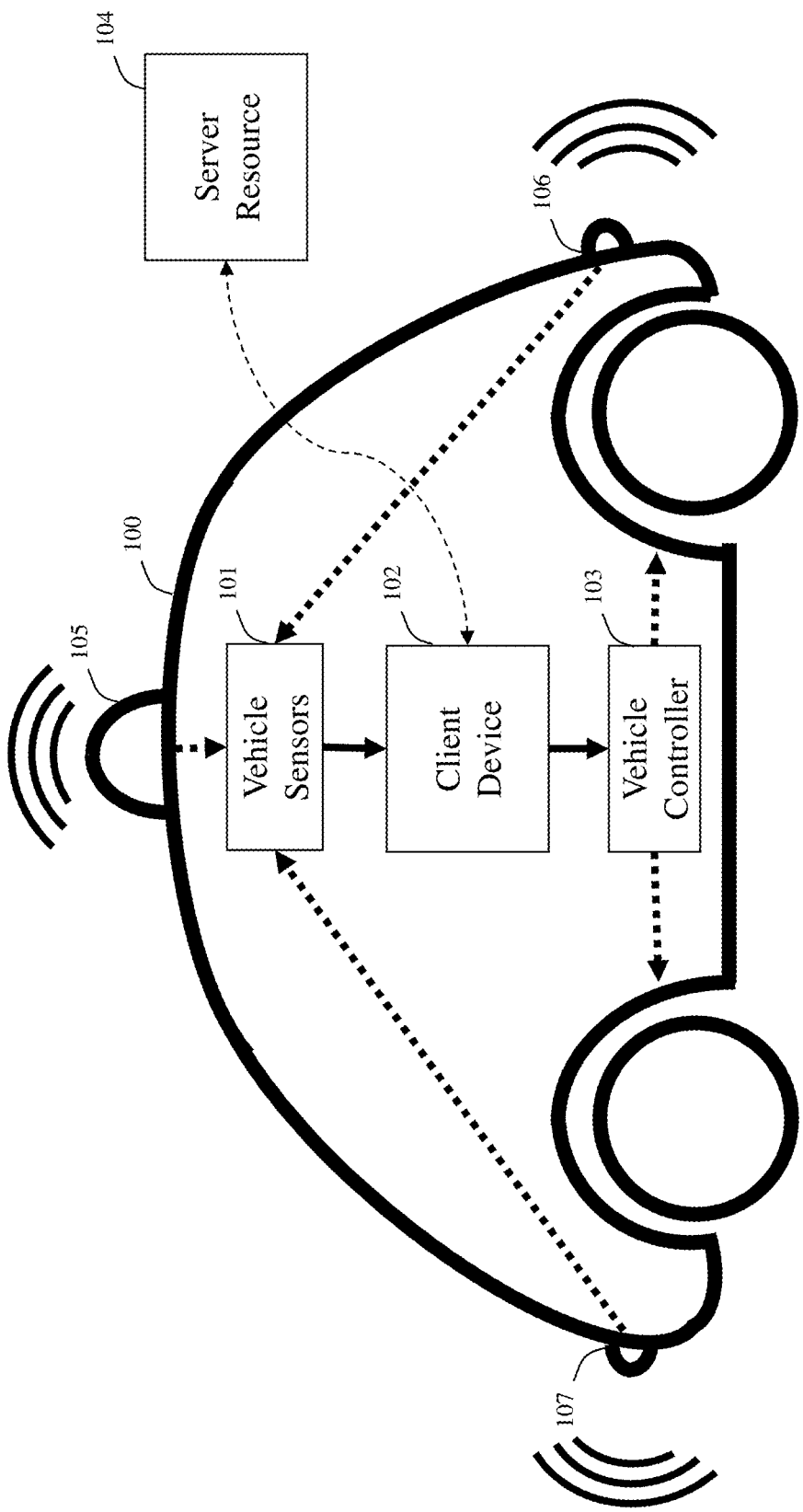
FIG. 6 A diagram showing predictive traffic law enforcement profiler apparatus integrated into a driver assisted or autonomous vehicle.

In yet another preferred embodiment, FIG. 5 presents another example view 64 of display 9. In view 64 of display 9, the indication operation 207 may combine a roadway map, preferably from databases 15 and or 17, with any combination of said predicted traffic law enforcement locations 215, schedules 213, enforcement profile 214 and historic traffic law enforcement records 222. Many variations of view 64 are possible, yet still provide combinations of estimated traffic law enforcement locations, schedules, and enforcement profile and historical traffic law enforcement data combined with a map of the roadway and should be considered within the scope of the present invention. View 64 demonstrates a preferred embodiment of many different display options for proving estimated and historic traffic law enforcement data to the driver, and preferably view 64 could be customizable to provide a subset or alterations of the data which the operator may select.

View 64 presents an example map of the roadway 50, 59, and 58. Overlaid on the roadway 50, is preferably the current location of the user 62, and optionally any of the current velocity, enforced speed limit, posted speed limit, the time 63 of the user 62. Preferably overlaid on the roadway 50 could be a plurality of indications 51, 54, and 57 showing estimated enforcement speed limit 214 derived from historical records of citations issued by traffic law enforcement or crowd sourced encounters at corresponding locations which were preferably calculated by the speed limit enforcement profiler 206. Said plurality of estimated enforcement speed limits 51, 54, 57 can vary and be correlated by time of day, date, direction, and location, traffic conditions and traffic flow rates and the patrol schedule can optionally be presented for corresponding locations 215.

Furthermore, in a preferred embodiment, various methods could be utilized for conveying said plurality of enforcement speeds 51, 54, 57 including color or gradient coding sections of roadway to correspond to enforced speed limit ranges as indicated by 58, 83, 84, 85 or numerical representations 51, 54, 57. Additionally, various methods could be utilized for conveying location citation density which indicates the intensity of patrols at a location as could be indicated by 58, 83, 84, 85 wherein the shade or color of sections of roadway could encode the level of patrol intensity. Preferably overlaid on the roadway 50 is the real time and historic traffic flow rates which could preferably be color encoded whereby traffic flow rate is encoded relative to the posted speed limit at that location. Preferably overlaid on the roadway 50 could be a plurality of indications 72 showing estimated enforcement austerity 214 at corresponding plurality of locations. Said austerity 72 could preferably include providing combinations of the enforcement leniency profile, speed limit enforcement austerity relative to average traffic flow velocity, location enforcement austerity relative to average traffic volume, speed limit enforcement austerity relative to average traffic velocity and other austerity metrics of the present invention and those presented in Table 1.

Additionally, example symbols 52, 53, 55 and 56 may represent a plurality, of predicted patrol locations 215 over a time period and locations of interest 223, preferably determined by the Patrol Location Estimator 204, which identifies the locations where traffic law enforcement has historically issued citations. In a preferred embodiment of view 64, the locations of a plurality of historically issued citations or crowd sourced encounters 222, limited to the region of interest 223, may alternatively or additionally be displayed as shown by example symbols 73 and 74. Preferably the presentation of said plurality of historically issued citations 222 may be filtered by combinations of citation type, time, location and direction. In view 64, historically issued speeding citations 222 over a time period and region of interest 223 could be displayed as a histogram at a plurality of locations limited to the region of interest 223, examples of which include 70 and 71 which present the citation speed verses the number of speeding citations issued at said citation speed at said plurality of locations. Further, view 64 may identify a plurality of locations, within the region of interest 223, as speed traps, red light cameras, speed cameras, and aircraft enforced locations as indicated on 214, which preferably may be presented overlaid on view 64 as 55, 80, 81, 82 respectively. Other indications could be employed by the present operation 207 to identify speed traps, red light camera locations and speed camera locations and should be considered within the scope of the current invention.

View 64 can provide an indication of estimated traffic law enforcement patrol schedules 213 at a plurality of locations within the region of interest 223 as example indications 60, 65. Estimated patrol schedule indications 60, 65 preferably provide estimated patrol times, locations, and may preferably but not necessarily also provide any combinations of estimated enforced speed limit, the average speed at which citations were issued, citation variance from the mean, the minimum speed for which a speeding violation was issued, and a histogram of speeds for issued speeding citations. Alternative representations of 60,65 estimated traffic law enforcement patrol schedules 213 are possible and should be considered within the scope of the present invention.

The speed limit enforcement profile 214, patrol schedules 213, and patrol locations 215 can preferably be used in conjunction with road navigation planning to select a route between destinations with the fastest estimated enforcement speed limit to minimize driving time.

Additionally, the apparatus 14 and view 64 may preferably provide a set of historical citation and crowd sourced record database 2, 4, 5, 30 processing methods to enable searching, filtering, extracting, statistical processing, and viewing of historical traffic law enforcement citation and crowd sourced records preferably including histogram creation, distributions, scatter plots, tables and lists.

View 64 is an example of one realization to present the traffic law enforcement profiled information and historical records of citations and crowd source encounters, and many alterations of the above description are possible but still within the scope of the current invention.

While the above description contains many specifics, these should not be construed as limitations on the scope of the invention, but rather as an exemplification of one preferred embodiment thereof. It will be obvious to those skilled in the art that many modifications and alterations may be made without departing from the spirit and scope of the invention which should be determined not by the embodiments illustrated, but by the appended claims and their legal equivalents.

What is claimed is:

1. An apparatus for a vehicle traveling within a region used for one or more of increasing travel efficiencies of said vehicle, decreasing a probability of said vehicle receiving traffic law enforcement citations, and decreasing a probability of said vehicle being involved in accidents, said apparatus comprising:
   one or more location determining systems configured to:
      take one or more location-based measurements of said vehicle, responsive to taking said one or more location-based measurements, transmit said one or more location-based measurements;

one or more databases configured to store one or more records of roadway properties specific to at least said region, wherein said roadway properties specific to at least said region comprise one or more traffic law enforcement properties and road environmental condition properties, wherein said traffic law enforcement properties comprise one or more historical and/or real-time patrol locations and/or schedules, and wherein said road environmental condition properties comprise one or more conditions, values, types, speeds, direction of movements, and locations absolute and/or relative to said vehicle associated with one or more signage, road surfaces, road hazards, accidents, weather, school zones, construction zones, and surrounding vehicles;

one or more predictive processors configured to:

receive said one or more location-based measurements from said one or more location determining systems, responsive to receiving said one or more location-based measurements, determine a presence of said vehicle within said region based on said one or more location-based measurements received, responsive to determining said presence of said vehicle within said region, access said one or more records of roadway properties specific to at least said region within said one or more databases, responsive to accessing said one or more records of roadway properties specific to at least said region, process said one or more records of roadway properties specific to at least said region using one or more algorithms, wherein said one or more algorithms comprise one or more of filtering, artificial intelligence, machine learning, inferential statistics, data analytics, correlation, extrapolation, and statistical analysis, and wherein said processing said one or more records of roadway properties specific to at least said region using said one or more algorithms comprises one or more of deriving one or more of said traffic law enforcement properties from one or more issued citations and self-sourced-by-said-vehicle and/or crowd-sourced traffic law enforcement encounters, and deriving one or more of said road environmental condition properties from one or more self-sourced-by-said-vehicle and/or crowd-sourced road conditions, historical accident records, and real-time accident records;

responsive to processing said one or more records of roadway properties specific to at least said region, transmit one or more select portions of said one or more records of roadway properties based on meeting one or more predefined criteria, wherein said one or more predefined criteria pertain to one or more constraints identified by one or more human users, machine users, and default settings, and wherein said one or more constraints comprise one or more of said increasing said travel efficiencies of said vehicle, said decreasing said probability of said vehicle receiving said traffic law enforcement citations, and said decreasing said probability of said vehicle being involved in said accidents;

one or more vehicle controllers for said vehicle configured to:

receive said one or more select portions of said one or more records of roadway properties transmitted from said one or more predictive processors, and determine one or more vehicle control outputs based on said one or more select portions of said one or more records of roadway properties, wherein said one or more vehicle control outputs are determined based at least on said one or more constraints, and control said vehicle according to said one or more vehicle control outputs, wherein said one or more vehicle control outputs comprise one or more speed commands, direction of movement commands, and navigational commands, and wherein said navigational commands at least comprise route planning for said vehicle in said region; and one or more user interfaces configured to:

receive one or more inputs by one or more of said human users and said machine users, wherein said one or more inputs comprise one or more of said one or more constraints and one or more control commands relating to said processing of said one or more records of roadway properties specific to at least said region using said one or more algorithms by said one or more predictive processors, and responsive to receiving said one or more inputs, transmit said one or more inputs to said one or more predictive processors and said one or more vehicle controllers.

2. The apparatus of claim 1, said apparatus further comprising:

one or more network interfaces configured to enable communication between said one or more user interfaces, said one or more databases, said one or more vehicle controllers, said one or more location determining systems, said one or more predictive processors, one or more additional systems, and one or more external devices, wherein said one or more databases comprises two or more physically and logically distributed databases, and wherein one or more of said one or more databases and said one or more user interfaces are further configured to be accessible by one or more of said one or more additional systems and said one or more external devices via said one or more network interfaces.

3. The apparatus of claim 1, said apparatus further comprising:

one or more sensors configured to:

detect one or more said traffic law enforcement properties and said road environmental condition properties, and responsive to detecting said one or more said traffic law enforcement properties and said road environmental condition properties, transmit said one or more said traffic law enforcement properties and said road environmental condition properties to said one or more predictive processors;

wherein said one or more predictive processors are further configured to:
  receive said one or more said traffic law enforcement properties and said road environmental condition properties transmitted by said one or more sensors,
  responsive to receiving said one or more said traffic law enforcement properties and said road environmental condition properties, associate said one or more location-based measurements received from said one or more location determining systems with said one or more said traffic law enforcement properties and said road environmental condition properties received from said one or more sensors based on one or more locations said vehicle was located when said one or more sensors detected said one or more said traffic law enforcement properties and said road environmental condition properties,
  responsive to associating said one or more said traffic law enforcement properties and said road environmental condition properties with said one or more location-based measurements, transmit said one or more said traffic law enforcement properties and said road environmental condition properties that have been associated with said one or more location-based measurements to said one or more databases as said one or more records of roadway properties specific to at least said region; and
wherein said one or more databases are further configured to:
  receive said one or more records of roadway properties specific to at least said region transmitted from said one or more predictive processors, and
  responsive to receiving said one or more records of roadway properties specific to at least said region, store said one or more records of roadway properties specific to at least said region.

4. The apparatus of claim 1, said apparatus further comprising:
  one or more indicators configured to:
    receive said one or more select portions of said one or more records of roadway properties transmitted from said one or more predictive processors, and
    responsive to receiving said one or more select portions of said one or more records of roadway properties, present said one or more select portions of said one or more records of roadway properties,
    wherein said one or more indicators comprise one or more audio presentation interfaces, visual presentation interfaces, computer interfaces, and network interfaces.

5. The apparatus of claim 1, said apparatus further comprising:
  one or more time determining systems configured to:
    determine one or more times and dates, and
    transmit said one or more said times and said dates to one or more of said one or more predictive processors, said one or more vehicle controllers, and said one or more user interfaces;
  wherein said one or more predictive processors are further configured to:
    receive said one or more said times and said dates transmitted by said one or more time determining systems,
    responsive to receiving said one or more said times and said dates, associate said one or more said times and said dates received from said one or more time determining systems with said one or more records of roadway properties specific to at least said region within said one or more databases accessed, based on when said one or more said traffic law enforcement properties and said road environmental condition properties were included within one or more of said one or more records of roadway properties specific to at least said region on said one or more databases, and
    responsive to associating said one or more said traffic law enforcement properties and said road environmental condition properties with said one or more said times and said dates, transmit said one or more said traffic law enforcement properties and said road environmental condition properties that have been associated with said one or more said times and said dates to said one or more databases as said one or more records of roadway properties specific to at least said region;
  wherein said one or more databases are further configured to:
    receive said one or more records of roadway properties specific to at least said region transmitted from said one or more predictive processors, and
    responsive to receiving said one or more records of roadway properties specific to at least said region, store said one or more records of roadway properties specific to at least said region;
  wherein said one or more vehicle controllers are further configured to receive said one or more said times and said dates transmitted by said one or more time determining systems; and
  wherein said one or more user interfaces are further configured to receive said one or more said times and said dates transmitted by said one or more time determining systems.

6. The apparatus of claim 1, said apparatus further comprising:
  one or more direction determining systems configured to:
    determine one or more direction of movements of said vehicle, and
    transmit said one or more said direction of movements to one or more of said one or more predictive processors, said one or more vehicle controllers, and said one or more user interfaces;
  wherein said one or more predictive processors are further configured to:
    receive said one or more said direction of movements transmitted by said one or more direction determining systems,
    responsive to receiving said one or more said direction of movements, associate said one or more said direction of movements received from said one or more direction determining systems with said one or more records of roadway properties specific to at least said region within said one or more databases accessed, based on each particular direction of movement of said one or more said direction of movements that said vehicle was traveling in when said one or more said traffic law enforcement properties and said road environmental condition properties were included within one or more of said one or more records of roadway properties specific to at least said region on said one or more databases, and
    responsive to associating said one or more said traffic law enforcement properties and said road environmental condition properties with said one or more said direction of movements, transmit said one or more said traffic law enforcement properties and said road environmental condition properties that have been associated with said one or more said direction of movements to said one or more databases as said one or more records of roadway properties specific to at least said region; and wherein said one or more databases are further configured to:
- receive said one or more records of roadway properties specific to at least said region transmitted from said one or more predictive processors, and
- responsive to receiving said one or more records of roadway properties specific to at least said region, store said one or more records of roadway properties specific to at least said region;

wherein said one or more vehicle controllers are further configured to receive said one or more said direction of movements transmitted by said one or more time determining systems; and wherein said one or more user interfaces are further configured to receive said one or more said direction of movements transmitted by said one or more time determining systems.

7. The apparatus of claim 3,
wherein said one or more sensors comprise one or more road environmental condition sensors configured to detect one or more of said road environmental condition properties; and
wherein said signage comprises one or more posted roadway signs, speed limit signs, stop signs, caution signs, and traffic signs.

8. The apparatus of claim 2,
wherein said one or more additional systems and said one or more external devices comprise one or more speed determining systems, one or more direction determining systems, and one or more vehicle telemetry sharing service devices,
wherein said one or more speed determining systems are configured to:
- determine one or more speeds of said vehicle, and
- transmit said one or more speeds of said vehicle that have been determined;

wherein said one or more direction determining systems are configured to:
- determine one or more direction of movements of said vehicle, and
- transmit said one or more direction of movements of said vehicle that have been determined;

wherein said one or more vehicle telemetry sharing service devices are configured to:
- receive one or more of said one or more select portions of said one or more records of roadway properties that have been transmitted from said one or more predictive processors, one or more speeds of said vehicle that have been transmitted from said one or more speed determining systems, and said one or more direction of movements of said vehicle that have been transmitted from said one or more direction determining systems, and
- transmit one or more of said one or more speeds of said vehicle that have been received via said one or more network interfaces, said one or more direction of movements of said vehicle that have been received via said one or more network interfaces, and said one or more select portions of said one or more records of roadway properties that have been received via said one or more network interfaces.

9. The apparatus of claim 2,
wherein said one or more external devices comprises one or more fleet management servers, and
wherein said one or more fleet management servers are configured to remotely utilize said one or more user interfaces via said one or more network interfaces.

10. The apparatus of claim 1,
wherein said one or more predictive processors are further configured to:
- receive one or more lists of rules from said one or more user interfaces,
- determine one or more maximum speeds said vehicle may travel within at least said region as a function of said one or more records of roadway properties specific to at least said region, using one or more rules engines configured to utilize said one or more lists of rules received, wherein said receiving of said one or more inputs by one or more of said human users and said machine users by said one or more user interfaces further comprises configuring said one or more lists of rules to be used by said one or more rules engines when determining said one or more maximum speeds said vehicle may travel, and wherein said one or more user interfaces are further configured to transmit said one or more lists of rules to said one or more predictive processors.

11. The apparatus of claim 1, wherein said processing of said one or more records of roadway properties specific to at least said region using said one or more algorithms by said one or more predictive processors further comprises:
- determining one or more attributes of said one or more records of roadway properties specific to at least said region,
- wherein said one or more attributes comprise one or more enforced speed limits, speed trap enforced locations, speed limit enforcement by aircraft locations, speed camera enforced locations, red light camera enforced intersections, posted speed limits, histograms of enforced traffic laws, location citation densities, location patrol intensities, enforcement austerities, enforcement leniencies, real-time traffic flow rates, historic traffic flow rates, and safe following distances.

12. The apparatus of claim 1,
wherein said one or more databases further contain one or more maps of one or more roadway systems within at least said region,
wherein said one or more predictive processors are further configured to:
- determine one or more locations of said one or more select portions of said one or more records of roadway properties using at least said one or more location-based measurements made by said one or more location determining systems,
- access said one or more maps of said one or more roadway systems within at least said region on said one or more databases,
- associate said one or more select portions of said one or more records of roadway properties with said one or more locations on said one or more maps of said one or more roadway systems within at least said region,
- update said one or more maps of said one or more roadway systems within at least said region after including said one or more select portions of said one or more records of roadway properties onto said one or more maps of said one or more roadway systems within at least said region based on said one or more locations that have been associated, and
transmit said one or more maps of said one or more roadway systems within at least said region that have been updated,
wherein said one or more indicators are further configured to receive said one or more maps of said one or more roadway systems within at least said region that have been updated and transmitted by said one or more predictive processors,
wherein said one or more indicators comprises one or more displays,
wherein said one or more displays are configured to present said one or more maps of said one or more roadway systems within at least said region that have been updated and transmitted by said one or more predictive processors.

13. The apparatus of claim 1,
wherein said processing of said one or more records of roadway properties specific to at least said region using said one or more algorithms by said one or more predictive processors further comprises:
determining one or more attributes of said one or more records of roadway properties specific to at least said region,
wherein said one or more attributes comprise one or more enforced speed limits, speed trap enforced locations, speed limit enforcement by aircraft locations, speed camera enforced locations, red light camera enforced intersections, posted speed limits, histograms of enforced traffic laws, location citation densities, location patrol intensities, enforcement austerities, enforcement leniencies, real-time traffic flow rates, historic traffic flow rates, and safe following distances;
wherein said one or more databases further contain one or more maps of one or more roadway systems within at least said region;
wherein said one or more predictive processors further comprise one or more routing algorithms;
wherein said one or more predictive processors are further configured to:
determine one or more locations of said one or more select portions of said one or more records of roadway properties using at least said one or more location-based measurements made by said one or more location determining systems,
access said one or more maps of said one or more roadway systems within at least said region on said one or more databases,
associate said one or more select portions of said one or more records of roadway properties with said one or more locations on said one or more maps of said one or more roadway systems within at least said region;
receive one or more starting locations and one or more destination locations from said one or more user interfaces,
determine one or more possible routes from said one or more starting locations to said one or more destination locations utilizing said one or more routing algorithms,
compute one or more metrics for each of said one or more possible routes from said one or more starting locations to said one or more destination locations based on said one or more select portions of said one or more records of roadway properties,
wherein said one or more metrics comprise one or more travel efficiencies of said vehicle, probabilities of said vehicle receiving said traffic law enforcement citations, and probabilities of said vehicle being involved in said accident,
determine one or more optimum routes of said one or more possible routes from said one or more starting locations to said one or more destination locations based on said one or more metrics,
associate said one or more optimum routes of said one or more possible routes from said one or more starting locations to said one or more destination locations on said one or more maps of said one or more roadway systems within at least said region,
update said one or more maps of said one or more roadway systems within at least said region to include said one or more optimum routes of said one or more possible routes from said one or more starting locations to said one or more destination locations that have been associated and said one or more select portions of said one or more records of roadway properties based on said one or more locations that have been associated, and
transmit said one or more maps of said one or more roadway systems within at least said region that have been updated,
wherein said one or more user interfaces are further configured to:
accept route guidance inputs comprising said one or more starting locations and said one or more destination locations contained within said one or more maps of said one or more roadway systems within at least said region,
transmit said one or more starting locations and said one or more destination locations to said one or more predictive processors,
wherein said one or more vehicle controllers for said vehicle are further configured to:
receive said one or more maps of said one or more roadway systems within at least said region that have been updated and transmitted by said one or more predictive processors,
determine said one or more vehicle control outputs based on said one or more maps of said one or more roadway systems that have been received,
wherein said navigational commands at least further comprise route execution for said vehicle in said region,
wherein said route execution comprises one or more of:
controlling said vehicle to follow or not to follow one or more of said one or more optimum routes,
controlling said vehicle to follow or not to follow one or more of said one or more possible routes that are not one of said one or more optimum routes,
modifying one or more of said one or more optimum routes of said one or more possible routes,
modifying one or more of said one or more possible routes that are not one of said one or more optimum routes,
executing one or more specific vehicle control actions at one or more specific locations along one or more of said one or more optimum routes of said one or more possible routes, and
executing said one or more specific vehicle control actions at said one or more specific locations along one or more of said one or more possible routes that are not one of said one or more optimum routes,
wherein said one or more specific vehicle control actions at said one or more specific locations comprises controlling a speed of said vehicle relative to said one or more attributes comprising at least said enforced speed limits, posted speed limits, real-time traffic flow rates, historical traffic flow rates, and safe driving distances.

14. The apparatus of claim 1, said apparatus further comprising:
one or more networks configured to enable communication between said one or more user interfaces, said one or more databases, said one or more vehicle controllers, and said one or more predictive processors,
wherein said one or more user interfaces comprise one or more applications running on one or more smart phones and tablets,
wherein said one or more databases comprise two or more physically and logically distributed databases,
wherein said two or more physically and logically distributed databases are configured to be accessible by said one or more applications running on said one or more smart phones and tablets via said one or more networks, and
wherein said one or more applications running on said one or more smart phones and tablets are further configured to receive said one or more select portions of said one or more records of roadway properties transmitted from said one or more predictive processors via said one or more networks.

15. The apparatus of claim 1, said apparatus further comprising one or more network interfaces configured to enable communication between said one or more databases, said one or more predictive processors, and said one or more user interfaces,
wherein said one or more predictive processors comprise two or more physically or logically distributed predictive processors,
wherein said one or more databases comprise two or more physically or logically distributed databases, and
wherein said two or more physically or logically distributed predictive processors and said two or more physically or logically distributed databases are each configured to communicate with each other through said one or more network interfaces, and
wherein said one or more user interfaces are further configured to receive said one or more select portions of said one or more records of roadway properties transmitted from said two or more physically or logically distributed predictive processors after accessing said two or more physically or logically distributed databases via said one or more network interfaces.

16. The apparatus of claim 1,
wherein said one or more user interfaces are further configured to:
enable said one or more human users and said one or more machine users to create one or more new inputs of said self-sourced-by-said-vehicle and/or crowd-sourced traffic law enforcement encounters of said traffic law enforcement properties and said self-sourced-by-said-vehicle and/or crowd-sourced road conditions of said road environmental condition properties, and
responsive to said one or more new inputs being created, transmit said one or more new inputs to said one or more predictive processors,
wherein said one or more predictive processors are further configured to:
receive said one or more new inputs from said one or more user interfaces, and
responsive to receiving said one or more new inputs, transmit said one or more new inputs to said one or more databases,
wherein said one or more databases are further configured to:
receive said one or more new inputs from said one or more predictive processors, and
responsive to receiving said one or more new inputs, store said one or more new inputs as said one or more records of roadway properties specific to at least said region.

17. The apparatus of claim 1,
wherein said one or more user interfaces comprise one or more audio interfaces configured to enable said one or more inputs to be made by one or more voices and sounds.

18. The apparatus of claim 1, said apparatus further comprising:
one or more indicators configured to:
receive said one or more select portions of said one or more records of roadway properties transmitted from said one or more predictive processors, and
responsive to receiving said one or more select portions of said one or more records of roadway properties, present said one or more select portions of said one or more records of roadway properties;
wherein said one or more predictive processors are further configured to:
derive one or more historical encounters from said one or more issued citations and self-sourced-by-said-vehicle and/or crowd-sourced traffic law enforcement encounters using said one or more algorithms,
wherein said traffic law enforcement properties further comprise said one or more historical encounters,
wherein said one or more historical encounters comprise one or more attributes,
wherein said one or more attributes comprise one or more traveling directions, encounter locations, encounter times, violation speeds, and citation types, and
wherein said processing said one or more records of roadway properties specific to at least said region comprises filtering by said one or more algorithms based on said one or more attributes serving as one or more filter criteria when input as said one or more inputs transmitted by said one or more user interfaces, and
responsive to deriving said one or more historical encounters, transmit said one or more attributes of said one or more historical encounters that have been derived to said one or more user interfaces;
wherein said one or more user interfaces are further configured to:
receive said one or more attributes of said one or more historical encounters that have been transmitted by said one or more predictive processors,
wherein said one or more inputs comprise said one or more attributes serving as said one or more filter criteria.

19. The apparatus of claim 1, said apparatus further comprising:
- one or more speed determining systems configured to:
  - determine one or more speeds of said vehicle, and
  - transmit said one or more speeds of said vehicle that have been determined;
- wherein said one or more vehicle controllers are further configured to receive said one or more speeds of said vehicle that have been transmitted from said one or more speed determining systems; and
- wherein said one or more vehicle controllers comprise one or more cruise controllers, adaptive cruise controllers, lane assist controllers, steering assist controllers, semi-autonomous controllers, fully autonomous controllers, and navigational routing controllers.

20. The apparatus of claim 7, said apparatus further comprising:
- one or more speed determining systems configured to:
  - determine one or more speeds of said vehicle, and
  - transmit said one or more speeds of said vehicle that have been determined;
- wherein said processing of said one or more records of roadway properties specific to at least said region using said one or more algorithms by said one or more predictive processors further comprises:
  - determining one or more attributes of said one or more records of roadway properties specific to at least said region,
    - wherein said one or more attributes comprise one or more enforced speed limits, speed trap enforced locations, speed limit enforcement by aircraft locations, speed camera enforced locations, red light camera enforced intersections, posted speed limits, histograms of enforced traffic laws, location citation densities, location patrol intensities, enforcement austerities, enforcement leniencies, real-time traffic flow rates, historic traffic flow rates, and safe following distances;
- wherein said one or more predictive processors are further configured to:
  - determine one or more locations of said one or more select portions of said one or more records of roadway properties using at least said one or more location-based measurements made by said one or more location determining systems,
  - responsive to determining said one or more locations of said one or more select portions of said one or more records of roadway properties, determine one or more of said enforced speed limits, said posted speed limits, said real-time traffic flow rates, said historic traffic flow rates, and said safe following distances, based at least on said one or more locations of said one or more select portions of said one or more records of roadway properties, and
  - transmit one or more of said one or more locations of said one or more select portions of said one or more records of roadway properties and said one or more of said enforced speed limits, said posted speed limits, said real-time traffic flow rates, said historical traffic flow rates, and said safe following distances; and
- wherein said one or more vehicle controllers are further configured to:
  - receive said one or more of said one or more locations of said one or more select portions of said one or more records of roadway properties and said one or more of said enforced speed limits, said posted speed limits, said real-time traffic flow rates, said historical traffic flow rates, and said safe following distances that have been transmitted from said one or more predictive processors,
  - determine said one or more vehicle control outputs, wherein said one or more vehicle control outputs comprise said one or more speed commands at said one or more locations received relative to said one or more speeds of said vehicle received and relative to said one or more of said enforced speed limits, said posted speed limits, said real-time traffic flow rates, said historical traffic flow rates, and said safe traveling distances received.

21. A method used by a vehicle traveling through a region for one or more of increasing travel efficiencies of said vehicle, decreasing a probability of said vehicle receiving traffic law enforcement citations, and decreasing a probability of said vehicle being involved in accidents, utilizing at least one or more sensors, one or more location determining systems, one or more databases, one or more predictive processors, one or more vehicle controllers, and one or more user interfaces, said method comprising the steps of:
- sensing roadway properties specific to at least said region with said one or more sensors of said vehicle while traveling;
  - wherein said roadway properties specific to at least said region comprise one or more traffic law enforcement properties and road environmental condition properties,
  - wherein said traffic law enforcement properties comprise one or more historical and/or real-time patrol locations and/or schedules, and
  - wherein said road environmental condition properties comprise one or more conditions, values, types, speeds, direction of movements, and locations absolute and/or relative to said vehicle associated with one or more signage, road surfaces, road hazards, accidents, weather, school zones, construction zones, and surrounding vehicles;
- transmitting said roadway properties specific to at least said region from said one or more sensors to said one or more predictive processors;
- taking one or more location-based measurements of said vehicle using said one or more location determining systems at least each time one or more of said roadway properties specific to at least said region are sensed by said one or more sensors;
- transmitting said one or more location-based measurements from said one or more location determining systems to said one or more predictive processors;
- receiving said roadway properties specific to at least said region transmitted from said one or more sensors at said one or more predictive processors;
- receiving said one or more location-based measurements transmitted from said one or more location determining systems at said one or more predictive processors;
- associating said roadway properties specific to at least said region with said one or more location-based measurements as one or more records of said roadway properties specific to at least said region with said one or more predictive processors;
- transmitting said one or more records of said roadway properties specific to at least said region from said one or more predictive processors to said one or more databases;

receiving said one or more records of said roadway properties specific to at least said region transmitted from said one or more predictive processors at said one or more databases;
　　wherein said one or more databases are configured to store said one or more records of said roadway properties specific to at least said region that have been received;
determining a presence of said vehicle within said region based on said one or more location-based measurements received by said one or more predictive processors;
accessing said one or more records of roadway properties specific to at least said region within said one or more databases using said one or more predictive processors;
processing said one or more records of roadway properties specific to at least said region using one or more algorithms utilized by said one or more predictive processors,
　　wherein said one or more algorithms comprise one or more of filtering, artificial intelligence, machine learning, inferential statistics, data analytics, correlation, extrapolation, and statistical analysis, and
　　wherein said processing said one or more records of roadway properties specific to at least said region using said one or more algorithms comprises one or more of deriving one or more of said traffic law enforcement properties from one or more issued citations and self-sourced-by-said-vehicle and/or crowd-sourced traffic law enforcement encounters, and deriving one or more of said road environmental condition properties from one or more self-sourced-by-said-vehicle and/or crowd-sourced road conditions, historical accident records, and real-time accident records;
transmitting one or more select portions of said one or more records of roadway properties based on meeting one or more predefined criteria from said one or more predictive processors to said one or more vehicle controllers for said vehicle,
　　wherein said one or more predefined criteria pertain to one or more constraints identified by one or more human users, machine users, and default settings, and
　　wherein said one or more constraints comprise one or more of said increasing said travel efficiencies of said vehicle, said decreasing said probability of said vehicle receiving said traffic law enforcement citations, and said decreasing said probability of said vehicle being involved in said accidents;
receiving said one or more select portions of said one or more records of roadway properties transmitted from said one or more predictive processors at said one or more vehicle controllers for said vehicle;
determining one or more vehicle control outputs based on said one or more select portions of said one or more records of roadway properties using said one or more vehicle controllers for said vehicle,
　　wherein said one or more vehicle control outputs are determined based at least on said one or more constraints;
controlling said vehicle according to said one or more vehicle control outputs with said one or more vehicle controllers,
　　wherein said one or more vehicle control outputs comprise one or more speed commands, direction of movement commands, and navigational commands, and
　　wherein said navigational commands at least comprise route planning for said vehicle in said region;
receiving one or more inputs by one or more of said human users and said machine users from said one or more user interfaces,
　　wherein said one or more inputs comprise one or more of said one or more constraints and one or more control commands relating to said processing of said one or more records of roadway properties specific to at least said region using said one or more algorithms by said one or more predictive processors,
transmitting said one or more inputs from said one or more user interfaces to said one or more predictive processors and said one or more vehicle controllers; and
receiving said one or more inputs transmitted from said one or more user interfaces at said one or more predictive processors and said one or more vehicle controllers.

22. A system for a plurality of vehicles traveling within one or more regions used for one or more of increasing travel efficiencies of said plurality of vehicles, decreasing a probability of said plurality of vehicles receiving traffic law enforcement citations, and decreasing a probability of said plurality of vehicles being involved in accidents, said system comprising:
　　a plurality of apparatuses, wherein each apparatus of said plurality of apparatuses is for a specific vehicle of said plurality of vehicles, wherein each apparatus of said plurality of apparatuses comprises:
　　　　one or more location determining systems configured to:
　　　　　　take one or more location-based measurements of said specific vehicle of said plurality of vehicles,
　　　　　　responsive to taking said one or more location-based measurements, transmit said one or more location-based measurements;
　　　　one or more databases configured to store one or more records of roadway properties specific to at least said one or more regions,
　　　　　　wherein said roadway properties specific to at least said one or more regions comprise one or more traffic law enforcement properties and road environmental condition properties,
　　　　　　wherein said traffic law enforcement properties comprise one or more historical and/or real-time patrol locations and/or schedules, and
　　　　　　wherein said road environmental condition properties comprise one or more conditions, values, types, speeds, direction of movements, and locations absolute and/or relative to said vehicle associated with one or more signage, road surfaces, road hazards, accidents, weather, school zones, construction zones, and surrounding vehicles;
　　　　one or more predictive processors configured to:
　　　　　　receive said one or more location-based measurements from said one or more location determining systems,
　　　　　　responsive to receiving said one or more location-based measurements, determine a presence of said vehicle within a particular region of said one or more regions based on said one or more location-based measurements received, responsive to determining said presence of said vehicle within said particular region of said one or more regions, access said one or more records of roadway properties specific to at least said particular region of said one or more regions within said one or more databases, responsive to accessing said one or more records of roadway properties specific to at least said particular region of said one or more regions, process said one or more records of roadway properties specific to at least said particular region of said one or more regions using one or more algorithms,
- wherein said one or more algorithms comprise one or more of filtering, artificial intelligence, machine learning, inferential statistics, data analytics, correlation, extrapolation, and statistical analysis, and
- wherein said processing said one or more records of roadway properties specific to at least said region using said one or more algorithms comprises one or more of deriving one or more of said traffic law enforcement properties from one or more issued citations and self-sourced-by-said-specific-vehicle-of-said-plurality-of-vehicles and/or crowd-sourced traffic law enforcement encounters, and deriving one or more of said road environmental condition properties from one or more self-sourced-by-said-specific-vehicle-of-said-plurality-of-vehicles and/or crowd-sourced road conditions, historical accident records, and real-time accident records;

responsive to processing said one or more records of roadway properties specific to at least said particular region of said one or more regions, transmit one or more select portions of said one or more records of roadway properties based on meeting one or more predefined criteria,
- wherein said one or more predefined criteria pertain to one or more constraints identified by one or more human users, machine users, and default settings, and
- wherein said one or more constraints comprise one or more of said increasing said travel efficiencies of said specific vehicle of said plurality of vehicles, said decreasing said probability of said specific vehicle of said plurality of vehicles receiving said traffic law enforcement citations, and said decreasing said probability of said specific vehicle of said plurality of vehicles being involved in said accidents;

one or more vehicle controllers for said specific vehicle of said plurality of vehicles configured to:
- receive said one or more select portions of said one or more records of roadway properties transmitted from said one or more predictive processors, and
- determine one or more vehicle control outputs based on said one or more select portions of said one or more records of roadway properties,
  - wherein said one or more vehicle control outputs are determined based at least on said one or more constraints, and
- control said specific vehicle of said plurality of vehicles according to said one or more vehicle control outputs,
  - wherein said one or more vehicle control outputs comprise one or more speed commands, direction of movement commands, and navigational commands, and
  - wherein said navigational commands at least comprise route planning for said specific vehicle of said plurality of vehicles in said particular region of said one or more regions; and one or more user interfaces configured to:
- receive one or more inputs by one or more of said human users and said machine users,
  - wherein said one or more inputs comprise one or more of said one or more constraints and one or more control commands relating to said processing of said one or more records of roadway properties specific to at least said particular region of said one or more regions using said one or more algorithms by said one or more predictive processors, and
- responsive to receiving said one or more inputs, transmit said one or more inputs to said one or more predictive processors and said one or more vehicle controllers.

\* \* \* \* \*